US012602296B2

(12) United States Patent
Katuri et al.

(10) Patent No.: US 12,602,296 B2
(45) Date of Patent: *Apr. 14, 2026

(54) SYSTEM AND TECHNIQUES FOR BACKING UP SCALABLE COMPUTING OBJECTS

(71) Applicant: Rubrik, Inc., Palo Alto, CA (US)

(72) Inventors: Sai Kiran Katuri, Santa Clara, CA (US); Prateek Pandey, Bangalore (IN); Jihang Lim, Milpitas, CA (US); Amelia Vu, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/990,725

(22) Filed: Dec. 20, 2024

(65) Prior Publication Data

US 2025/0130904 A1 Apr. 24, 2025

Related U.S. Application Data

(63) Continuation of application No. 18/091,377, filed on Dec. 30, 2022, now Pat. No. 12,189,495.

(30) Foreign Application Priority Data

Oct. 26, 2022 (IN) .............................. 202241061025

(51) Int. Cl.
*G06F 11/14* (2006.01)
*G06F 11/1446* (2026.01)
(52) U.S. Cl.
CPC ...... *G06F 11/1469* (2013.01); *G06F 2201/84* (2013.01)

(58) Field of Classification Search
CPC ............. G06F 11/1469; G06F 2201/84; G06F 3/0619; G06F 3/065; G06F 3/067; G06F 11/1471
See application file for complete search history.

(56) References Cited

U.S. PATENT DOCUMENTS

| | | | |
|---|---|---|---|
| 9,557,932 B1 * | 1/2017 | Chopra | ............... G06F 11/1446 |
| 10,838,817 B1 * | 11/2020 | Joo | ........................ G06F 11/301 |
| 11,032,156 B1 | 6/2021 | Jain et al. | |
| 11,068,354 B1 * | 7/2021 | Ugur-Ozekinci | ... G06F 11/1474 |
| 11,216,563 B1 * | 1/2022 | Veselov | ............. H04L 63/1408 |
| 2016/0142483 A1 | 5/2016 | Nallathambi et al. | |

(Continued)

*Primary Examiner* — Merilyn P Nguyen
(74) *Attorney, Agent, or Firm* — Holland & Hart LLP

(57) ABSTRACT

A data management system (DMS) may support the backing up of scalable computing objects, such as hierarchical computing objects. For example, the DMS may backup a computing system and facilitate that capture and storage of snapshots of the computing system. The DMS may determine to capture a first snapshot of a computing object within the computing system. The DMS may identify components corresponding to respective portions of the computing object and cause the computing system to generate respective snapshots of the components. That is, the DMS may cause the computing system to generate multiple individual snapshots that together may constitute snapshot of the computing object. The DMS may generate the first snapshot that includes metadata for the snapshots of the components. The metadata may include a first identifier for the first snapshot and respective identifiers for the respective snapshots of the components.

20 Claims, 12 Drawing Sheets

(56) References Cited

U.S. PATENT DOCUMENTS

| | | | |
|---|---|---|---|
| 2016/0314046 A1* | 10/2016 | Kumarasamy | G06F 11/1435 |
| 2019/0391880 A1 | 12/2019 | Wang et al. | |
| 2020/0110675 A1 | 4/2020 | Wang et al. | |
| 2020/0409803 A1* | 12/2020 | Naidu | G06F 11/1451 |
| 2021/0096958 A1 | 4/2021 | Kumar et al. | |
| 2021/0240730 A1* | 8/2021 | Polisetty | G06F 16/273 |
| 2022/0147541 A1 | 5/2022 | Mallipeddi et al. | |
| 2022/0229734 A1* | 7/2022 | Seela | G06F 11/1451 |
| 2023/0023307 A1 | 1/2023 | Xiang et al. | |
| 2024/0126584 A1 | 4/2024 | Bagchi et al. | |

* cited by examiner

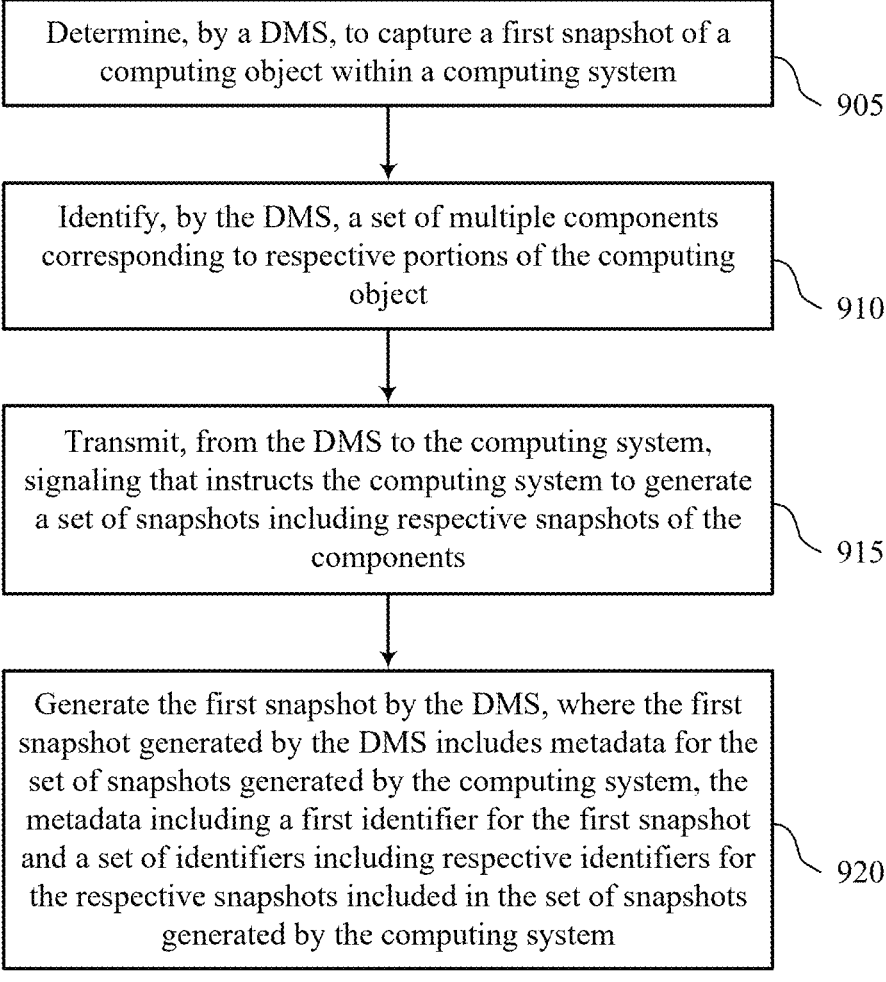

Determine, by a DMS, to capture a first snapshot of a computing object within a computing system

905

Identify, by the DMS, a set of multiple components corresponding to respective portions of the computing object

910

Transmit, from the DMS to the computing system, signaling that instructs the computing system to generate a set of snapshots including respective snapshots of the components

915

Generate the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system

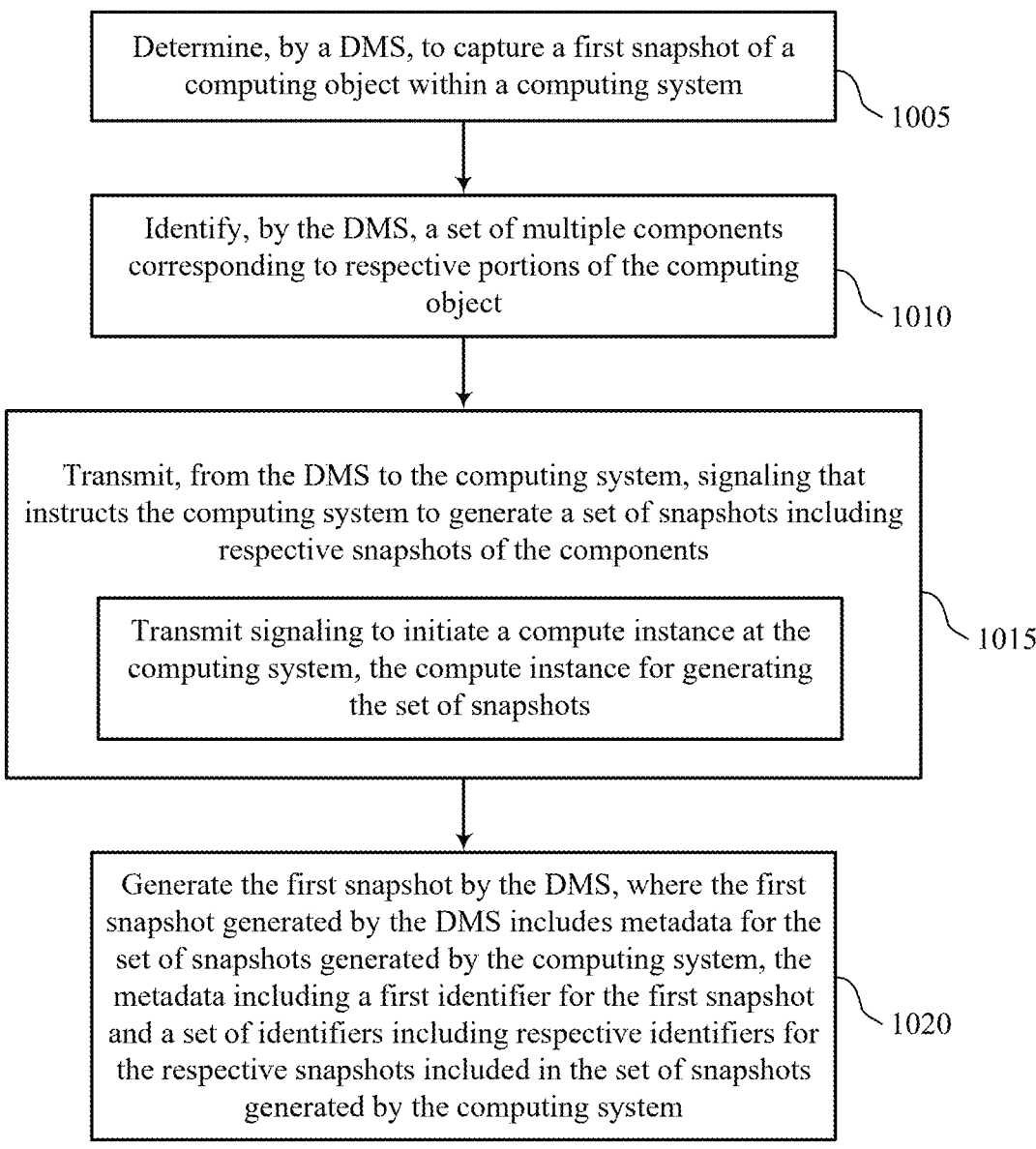

Determine, by a DMS, to capture a first snapshot of a computing object within a computing system

1005

Identify, by the DMS, a set of multiple components corresponding to respective portions of the computing object

1010

Transmit, from the DMS to the computing system, signaling that instructs the computing system to generate a set of snapshots including respective snapshots of the components Transmit signaling to initiate a compute instance at the computing system, the compute instance for generating the set of snapshots

1015

Generate the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system

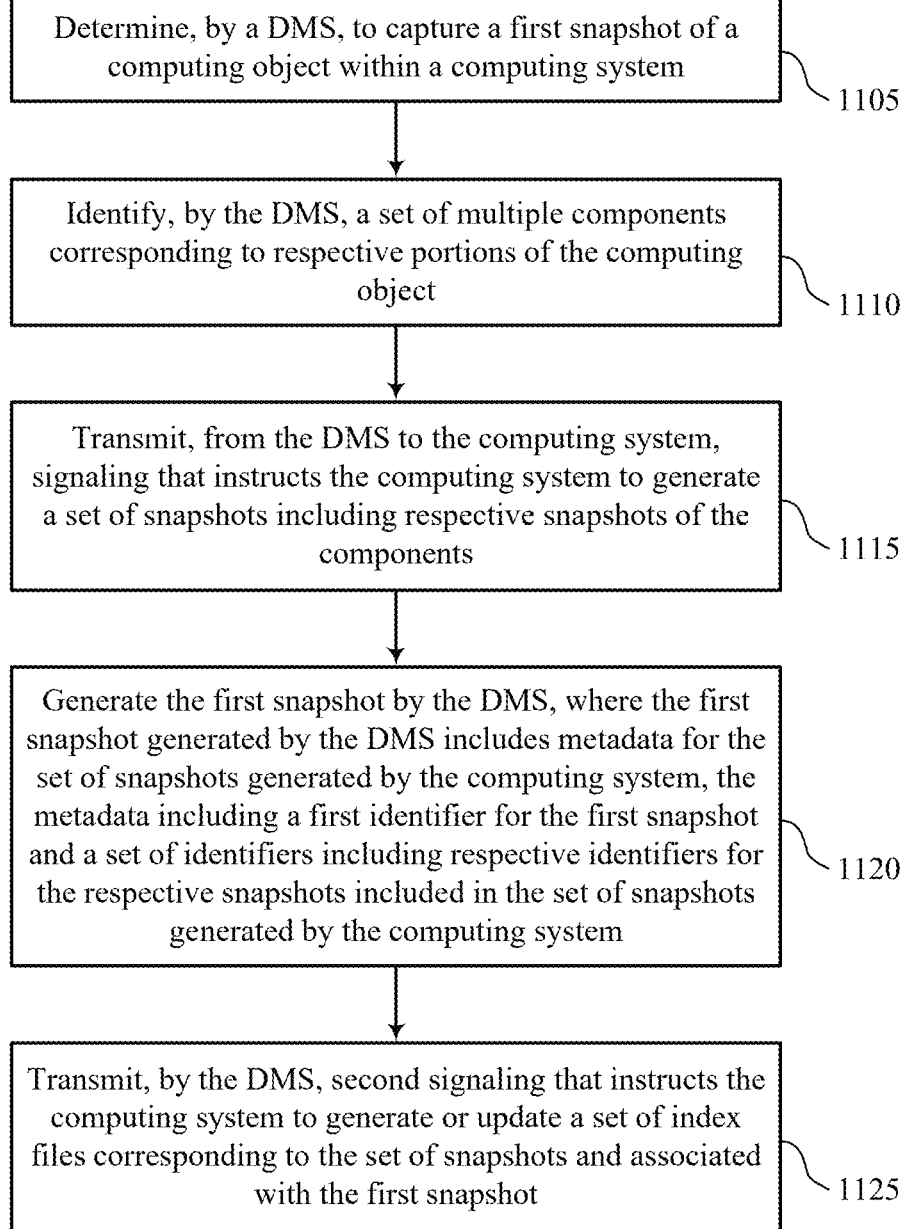

Determine, by a DMS, to capture a first snapshot of a computing object within a computing system

1105

Identify, by the DMS, a set of multiple components corresponding to respective portions of the computing object

1110

Transmit, from the DMS to the computing system, signaling that instructs the computing system to generate a set of snapshots including respective snapshots of the components

1115

Generate the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system

1120

Transmit, by the DMS, second signaling that instructs the computing system to generate or update a set of index files corresponding to the set of snapshots and associated with the first snapshot

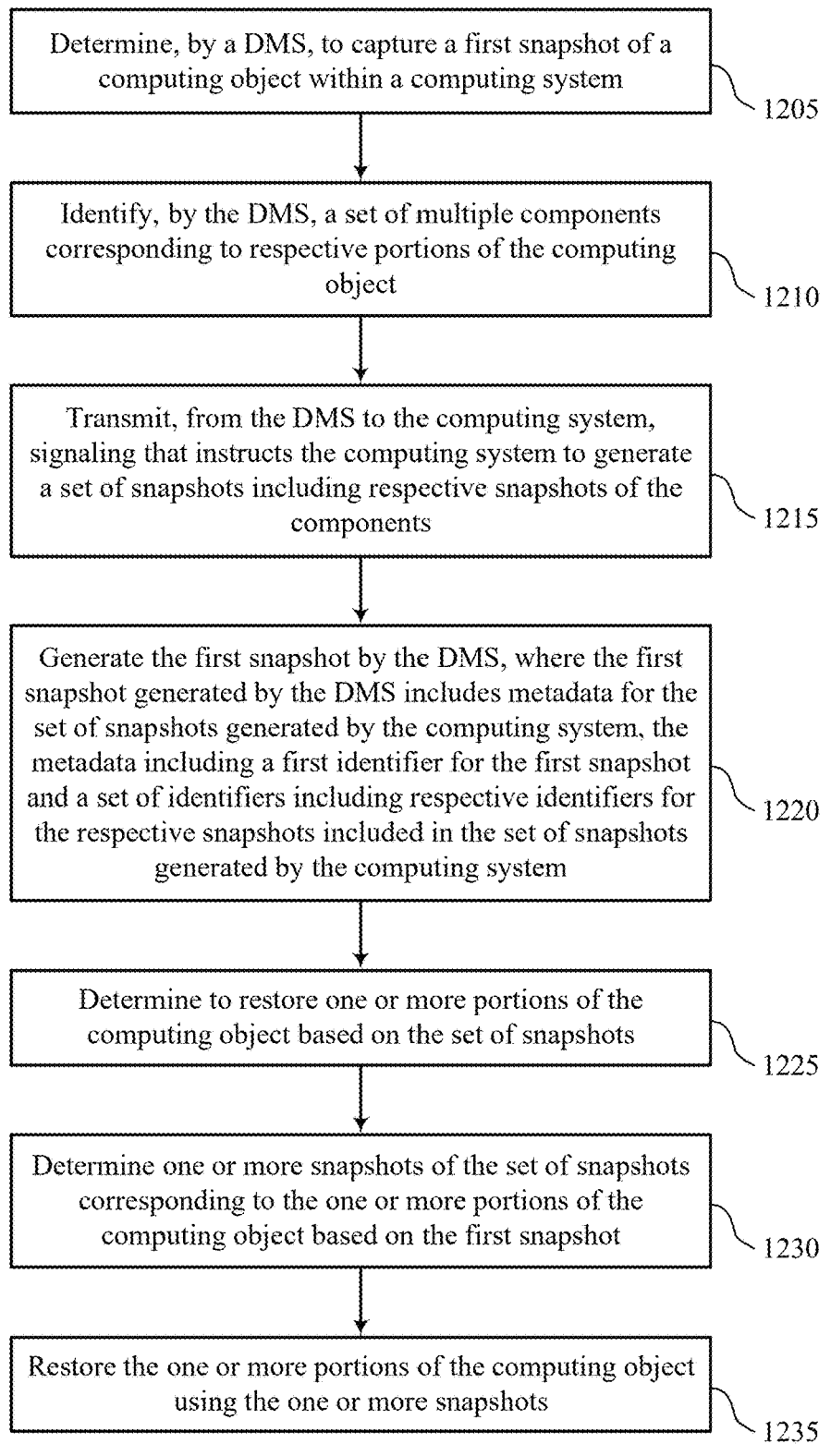

Determine, by a DMS, to capture a first snapshot of a computing object within a computing system

1205

Identify, by the DMS, a set of multiple components corresponding to respective portions of the computing object

1210

Transmit, from the DMS to the computing system, signaling that instructs the computing system to generate a set of snapshots including respective snapshots of the components

1215

Generate the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system

1220

Determine to restore one or more portions of the computing object based on the set of snapshots

1225

Determine one or more snapshots of the set of snapshots corresponding to the one or more portions of the computing object based on the first snapshot

1230

Restore the one or more portions of the computing object using the one or more snapshots

SYSTEM AND TECHNIQUES FOR BACKING UP SCALABLE COMPUTING OBJECTS

RELATED APPLICATIONS

The present application is a continuation of U.S. Pat. No. 12,189,495, entitled "SYSTEM AND TECHNIQUES FOR BACKING UP SCALABLE COMPUTING OBJECTS" and filed Dec. 30, 2022, which claims priority to Indian Patent Application number 202241061025, entitled "SYSTEM AND TECHNIQUES FOR BACKING UP SCALABLE COMPUTING OBJECTS" and filed Oct. 26, 2022, which is assigned to the assignee hereof and expressly incorporated by reference herein.

FIELD OF TECHNOLOGY

The present disclosure relates generally to database systems and data processing, and more specifically to system and techniques for backing up scalable computing objects.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 9 through 12 illustrate flowcharts showing methods that support system and techniques for backing up scalable computing objects in accordance with aspects of the present disclosure.

DETAILED DESCRIPTION

Figure 1:
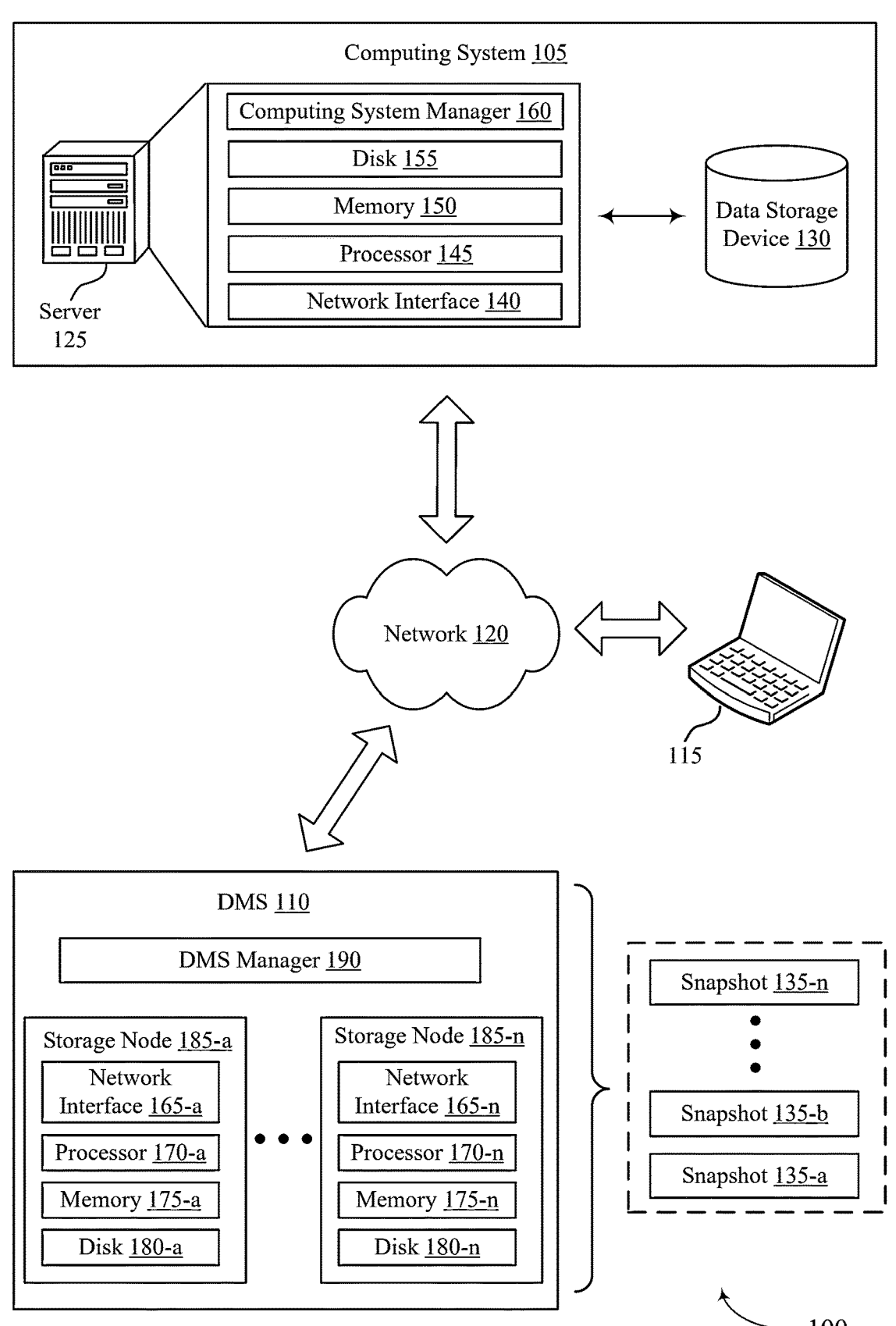
FIG. 1 illustrates an example of a computing environment that supports system and techniques for backing up scalable computing objects in accordance with aspects of the present disclosure.

A data management system (DMS) may provide backup and recovery services for data of a computing system. For example, the DMS may facilitate the capture (e.g., generation or ingestion) and storage of snapshots of the computing system (e.g., a computing object of the computing system such as a virtual machine, a database, a filesystem, a virtual disk, a virtual desktop, or other type of computing object or storage system), and the snapshots support later recovery (e.g., restoration) of the computing object. Such snapshots may be referred to herein as computing snapshots, or alternatively as snapshots. Some computing objects may include hundreds (e.g., thousands, and so on) of different resources (e.g., data sources) that may be captured in a single overarching snapshot of the computing object. These computing objects may be referred to as scalable objects, for example, due to the size of these computing objects scaling as the quantity of resources included in the computing objects increases. Examples of scalable computing objects include hierarchical computing objects and computing objects of group-based communications platform, among other examples. For example, a hierarchical computing object, such as a Microsoft 365 (M365) SharePoint computing object, among other examples, may include many web pages, lists, and document libraries, among other data sources, which may be configured as part of one or more hierarchies within the computing object. Computing objects of a group-based communication platform, such as Microsoft Teams computing object, among others, may include many private and public communication channels and files associated with the communication channels.

In some cases, a single overarching snapshot may be captured that represents a state of the computing object (e.g., the data thereof) at a particular point in time. However, as a computing object scales (e.g., increases in size, as the included quantity of resources increases, as the quantity of data thereof increases), scalable and efficient techniques for backing up such computing objects may be desired. For example, the complexity of managing the capture and indexing of snapshots of a computing object may increase as the quantity of resources and/or data included in the computing object increases. Additionally, the speed at which data is backed up during generation of a given snapshot may be limited. Thus, as the quantity of data to be backed up by a snapshot increases, so too may the latency of capturing the snapshot increase.

In accordance with examples described herein, a DMS may implement procedures that support scalable and efficient backup of computing objects. For example, to generate a snapshot of a computing object at a particular point in time, the DMS may facilitate the capture of separately manageable "sub" or "child" snapshots that may together constitute the overarching snapshot at the point in time. For instance, the DMS may determine to capture a first snapshot of a computing object within a computing system and may identify that the computing object includes multiple components (e.g., resources, data sources). The DMS may cause the computing system to generate respective snapshots of the components (e.g., an individual snapshot for each identified component of the computing object). For example, the DMS may transmit signaling to the computing system that instructs the computing system to generate the respective snapshots of the components. Each snapshot of an identified component may be a child snapshot. That is, each snapshot of an identified component may include data (e.g., updated data) of a respective portion of the computing object, and together, the snapshots of the identified components may include data (e.g., updated data) for an entirety of the computing object.

The DMS may generate the first snapshot that includes metadata for the overarching snapshot of the computing object at the point in time. For example, the first snapshot may include metadata that includes a first identifier (e.g., a snapshot number) for the first snapshot and respective identifiers for the snapshots of the components. The first snapshot may be representative of the overarching snapshot based on the metadata. For example, the first snapshot may map to each of the snapshots of the components such that the metadata of the first snapshot may be used by the DMS in managing (e.g., generating, indexing, searching, restoring) the snapshots of the components. As such, metadata for an overarching snapshot may be consolidated into a single snapshot generated by the DMS and may be used to manage the data for the overarching snapshot captured via respective child snapshots.

By implementing the generation and management of child snapshots of a respective portions of a computing object, the DMS may reduce a latency associated with generating an overarching snapshot of the computing object. For example, the child snapshots may be generated concurrently, thereby parallelizing the backing up of data of the computing object and reducing a latency at which the overarching snapshot may be generated. Recovery of portions of the computing object using respective child snapshots may similarly be parallelized, which may reduce a latency associated with such recovery operations. Additionally or alternatively, the complexity of managing and recovering increasingly large snapshots may be reduced by separating the overarching snapshot into smaller, separately manageable child snapshots. Such separation may also reduce a size of index files associated with the snapshots, which may reduce latency associated with searching and accessing the index files.

These and additional aspects of the present disclosure are further described below. Aspects of the disclosure are initially described in the context of computing environments and an object diagram. Aspects of the disclosure are additionally described in the context of a process flow. Aspects of the disclosure are further illustrated by and described with reference to apparatus diagrams, system diagrams, and flowcharts that relate to system and techniques for backing up scalable computing objects.

FIG. 1 illustrates an example of a computing environment 100 that supports system and techniques for backing up scalable computing objects in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely impacting other aspects of the performance of the computing system 105.

In accordance with examples described herein, the DMS 110 may support scalable techniques for backing up a computing object of the computing system 105, for example, to support scaling (e.g., increased size) of the computing object. For example, as computing objects increase in size, a complexity of managing (e.g., generating, indexing, searching, restoring) a snapshot of the computing object may increase or a latency of generating the snapshot may increase, among other issues. To reduce complexity and latency associated with snapshot management, the DMS 110 may be configured to cause the computing system 105 to generate separately manageable child snapshots of respective portions of a computing object within the rubric of an overarching snapshot of the computing object. For example, the DMS 110 may transmit signaling to the computing system 105 that causes the computing system 105 to generate a set of child snapshots of the respective portions of the computing object. The DMS 110 may generate a snapshot including metadata for the set of child snapshots that enables the DMS 110 to manage the set of child snapshots. For example, the metadata may include respective identifiers for the set of child snapshots, which may be used to individually manage (e.g., generate, access, index, restore) each of the child snapshots. As such, metadata for the overarching snapshot may be consolidated into a single snapshot generated by the DMS 110 and may be used to manage the data for the overarching snapshot captured via respective child snapshots.

Figure 2:
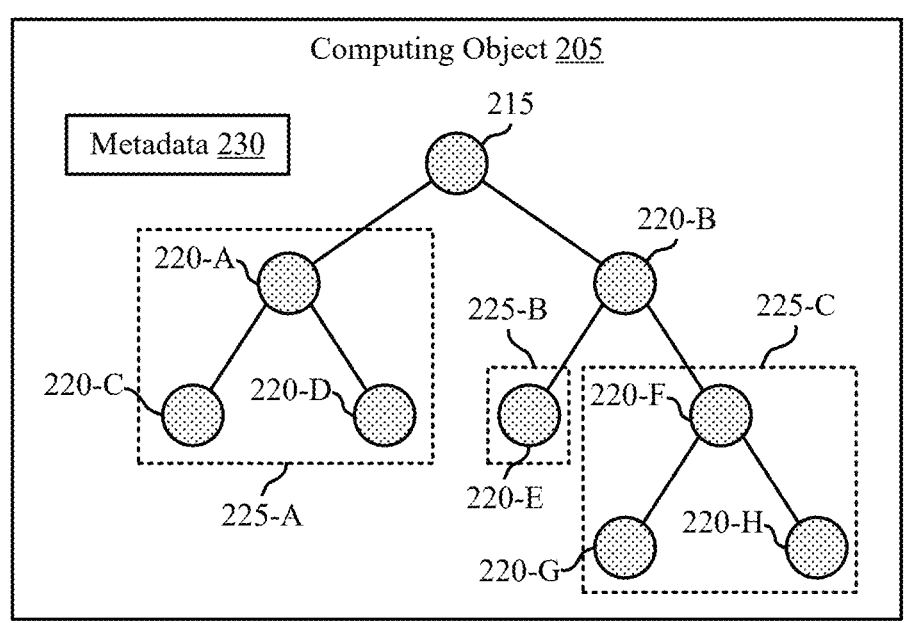
FIG. 2 illustrates an example of an object diagram that supports system and techniques for backing up scalable computing objects in accordance with aspects of the present disclosure.
Figure 2:
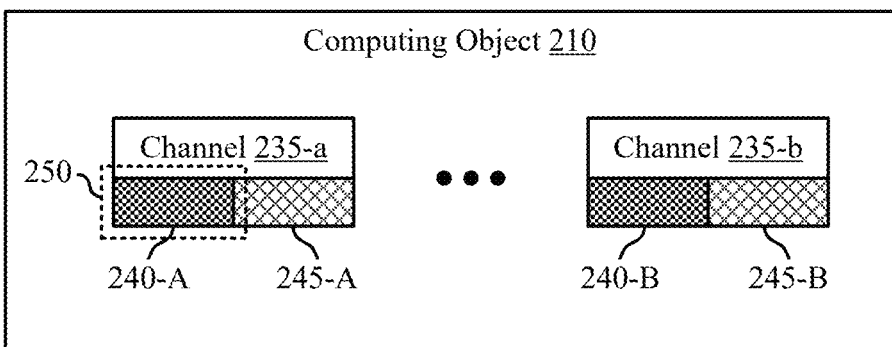

FIG. 2 illustrates an example of an object diagram 200 that supports system and techniques for backing up scalable computing objects in accordance with aspects of the present disclosure. The object diagram 200 may be implemented by aspects of the computing environment 100 described with reference to FIG. 1. For example, the object diagram 200 may be implemented by a DMS and a computing system as described with reference to FIG. 1.

The object diagram 200 may include a computing object 205 and a computing object 210, which may be examples of a computing object within the computing system, as described with reference to FIG. 1. The computing objects 205 and 210 may be examples of scalable computing objects for which complexity of snapshot management for the computing objects may increase as the size of the computing objects increases.

The computing object 205 may be an example of a hierarchical computing object including various resources arranged according to a hierarchical relationship. For example, the computing object 205 may include a resource 215 that is an overarching resource of the computing object 205. That is, the resource 215 may include one or more resources 220, which may include one or more resources 220, and so on. In the example of FIG. 2: the resource 215 may include a resource 220-*a* and a resource 220-*b*; the resource 220-*a* may include a resource 220-*c* and a resource 220-*d*; the resource 220-*b* may include a resource 220-*e* and a resource 220-*f*; and the resource 220-*f* may include a resource 220-*g* and a resource 220-*h* (e.g., although any quantity or combination of resources 215 and resources 220 may be included computing object 205). In some examples, the resource 215 may be an example of a site, such as a M365 SharePoint site, that includes various types of objects such as web pages, document libraries, lists, files, drives, or any combination thereof, among other types of objects (e.g., where the resources 220 may correspond to an object included in the site). The computing object 205 may also include metadata 230 (e.g., which may be included in the resource 215) that indicates a hierarchical relationship of the computing object 205. For example, the metadata 230 may relationships between the resource 215 and the resources 220 (e.g., between resources 220), such as how the resources 220 are arranged within the resource 215.

The computing object 210 may be an example of a group-based communication platform that includes various channels 235. For example, the group-based communication platform may be a platform (e.g., a group-based collaboration platform provided by Microsoft Teams or Slack®, among others) via which various devices (e.g., computing devices 115) may exchange data via a shared communication channel, such as a channel 235. In some examples, the group-based communication platform may operate (e.g., communicate with) various databases that, for example, store data associated with the various channels 235 supported by the group-based communication platform. The computing object 210 may include (e.g., support) any quantity of channels 235, such as a channel 235-a through a channel 235-b. In some examples, a channel 235 may include various objects, such as a conversations object 240 and a file object 245 (e.g., the channel 235-a may include a conversation object 240-a and a file object 245-a, the channel 235-b may include a conversation object 240-b and a file object 245-b). A conversation object 240 may include data associated with conversations (e.g., text, voice, video exchanges, and the like) between computing devices that may communicate via a channel 235. A file object 245 may include a set of filed associated with the channel 235, such as files exchanged via the channel 235.

In some examples, a channel 235 may be a public communication channel of the group-based communication platform or a private communication channel of the group-based communication platform. A public communication channel may be accessible to any computing device that may access the group-based communication platform. A private communication channel may be accessible to a specific group of the computing devices that may access the group-based communication platform and be inaccessible to computing devices outside of the group. In some examples, a file object 245 of a public communication channel may be stored in a single database (e.g., single document library) common to the public communication channels of the computing object 205. In some examples, a conversation object 240, a file object 245, or both, of a private communication channel may be stored in a site (e.g., a document library) that is specific to the private communication channel.

The DMS may cause the computing system to generate a snapshot (e.g., a snapshot 135) of the computing object 205 or 210 at a particular point in time. In some cases, the DMS may cause the computing system to generate a single snapshot of the computing object 205 that includes data (e.g., updated data) included in the resource 215 and includes the metadata 230. In some cases, the DMS may cause the computing system to generate a single snapshot of the computing object 210 that includes data (e.g., updated data) included in the channels 235-a through 235-b. In some cases, however, as the computing objects 205 and 210 increase in size (e.g., as the quantity of resources 220 increases, as the quantity of data included in the resource 215 increases, as the quantity of channels 235 increase), complexity and latency associated with managing (e.g., generating, indexing, searching, accessing, restoring) the single snapshot may also increase.

To reduce complexity and latency associated with snapshot management of the computing objects 205 and 210, among other benefits, the DMS may support the backup of data of the computing objects 205 and 210 at a particular point in time via multiple snapshots of respective resources or channels of the computing objects 205 and 210, which may be referred to as sub-snapshots or child snapshots. For example, to capture a snapshot of the computing object 205 at a first time, the DMS may instruct the computing system to generate a respective snapshot for each component 225 of the computing object 205. For instance, the computing object 205 may include multiple components 225 that each correspond to respective portions of the computing object 205. In the example of FIG. 2, the computing object 205 may include: a component 225-a corresponding to the resources 220-a, 220-c and 220-d; a component 225-b corresponding to the resource 220-e; and a component 225-c corresponding to the resources 220-f, 220-g, and 220-h. In some examples, the metadata 230 may be considered its own component 225. The DMS may instruct the computing system to generate a first child snapshot for the component 225-a (e.g., including data for the resources 220-a, 220-c, and 220-d), a second child snapshot for the component 225-b (e.g., including data for the resource 220-c), a third child snapshot for the component 225-c (e.g., including data for the resources 220-f, 220-g, and 220-h), and a fourth child snapshot for the metadata 230. Thus, the first, second, third, and fourth child snapshots may individually include data for the respective portions of the computing object 205 and together include data for the entire computing object 205.

In some examples, the DMS may identify the components 225 in accordance with a separation of application programming interfaces (APIs) used to access the portions of the computing object 205. For example, the DMS may determine that resources 220 accessed via a respective API may correspond to a respective component 225. For instance, In the example of FIG. 2, a first API may be used to access (e.g., read data from, write data to) the resources 220-a 220-c, and 22-d, a second API may be used to access the resource 220-e, and a third API may be used to access the resources 220-f, 220-g, and 220-h. Accordingly, the DMS may determine (e.g., identify) the component 225-a corresponding to resources 220 accessed via the first API, the component 225-b corresponding to resources 220 accessed via the second API, and the component 225-c corresponding to resources 220 accessed via the third API.

In some examples, the DMS may identify the components 225 in accordance with hierarchical relationships of the computing object 205. For example, the DMS may determine that each leaf node of the resource hierarchy (e.g., a resource 220 that does not include additional resources 220, such as a resource 220-c, 220-d, 220-c, 220-g, or 220-h) may correspond to respective component 225. In some examples, the DMS may identify the components 225 in accordance with types of the resources 220. For example, respective document libraries, web pages, or lists may correspond to respective components 225.

To capture a snapshot of the computing object 210 at a first time, the DMS may instruct the computing system to generate a respective child snapshot for each component 250 of the computing object 210. For example, the computing object 210 may include multiple components 250 that each correspond to respective portions of the computing object 210. For instance, in the example of FIG. 2, the computing object 210 may include a component 250 for each conversation object 240 and for each file object 245. In some other examples, the computing object 210 may include a component 250 for each channel 235. In some other examples, a component 250 may correspond to multiple file objects 245 or multiple conversation objects 240, such as file objects 245 or conversation objects 240 of multiple public communication channels stored in a common database. In some examples, the DMS may identify the components 250 in accordance with a separation of APIs used to access the portions of the computing object 210. That is, each component 250 may corresponding to a respective portion of the computing object 210 that is access via a respective API. The child snapshots may individually include data for the respective portions of the computing object 210 and together include data for the entire computing object 210.

To support managing the child snapshots (e.g., of the computing object 205 or 210) generated by the computing system, the DMS may generate a snapshot (e.g., a metadata snapshot) that includes metadata for the child snapshots. For example, the metadata may include an identifier for the snapshot (e.g., a snapshot number) and a list of respective identifiers for the child snapshots. The identifiers for the child snapshots may be used to individually manage (e.g., generate, index, access, restore) each of the child snapshots. Other metadata associated with the snapshot, such as a time (e.g., timestamp) that the snapshot was generated, an expiration of the snapshot, a storage location of the snapshot, respective storage locations of the child snapshots, among other types of metadata, may also be included in the snapshot. Thus, a single snapshot generated at the DMS may be used to manage multiple child snapshots of a computing object generated by the computing system that together constitute a single overarching snapshot of the computing object.

It is noted that the computing objects 205 and 210 are provided as examples of scalable computing objects and that the techniques described herein for scalable snapshot management may be adapted and applied to other computing objects including various arrangements of data sources (e.g., resources, channels).

Figure 3:
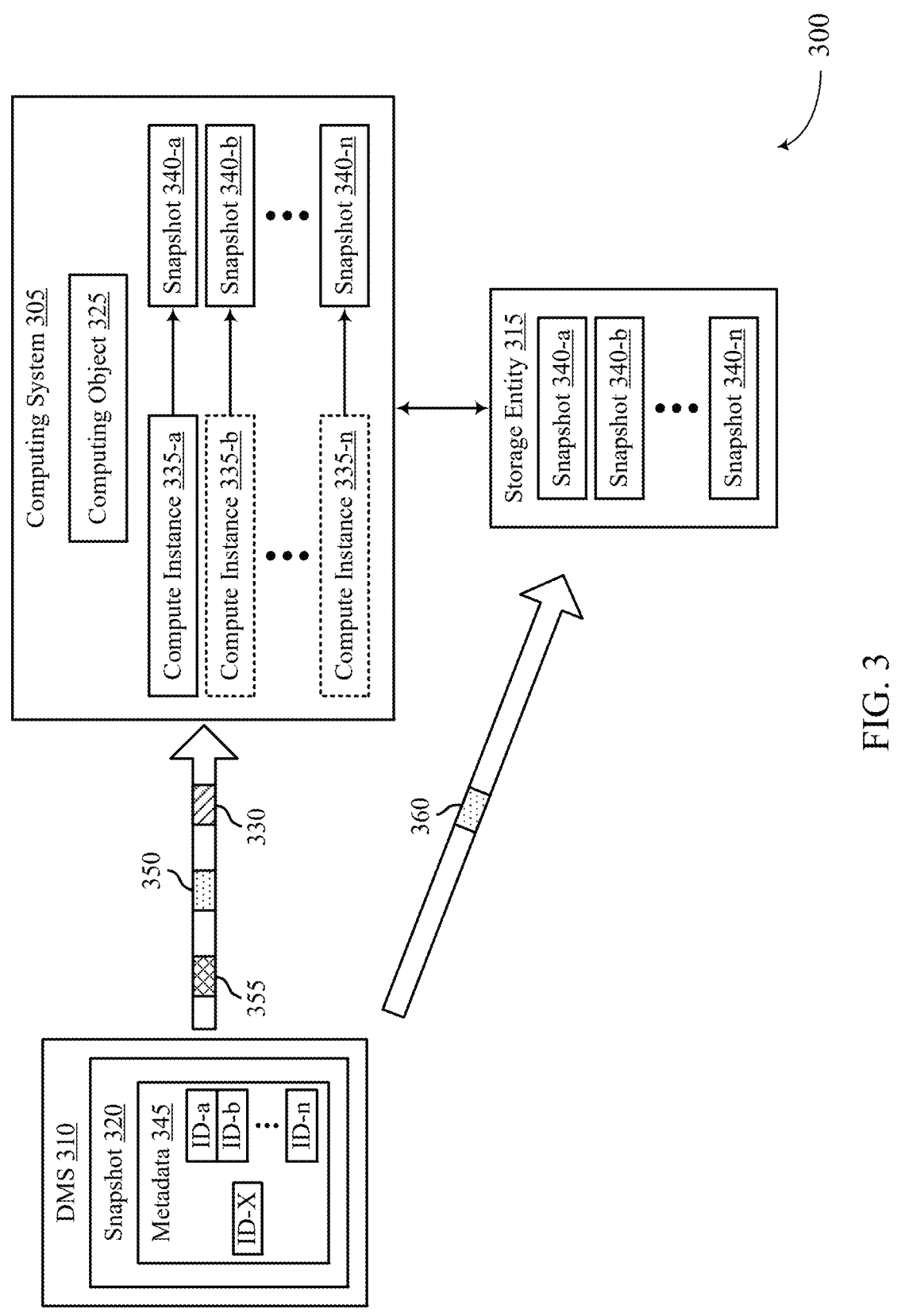
FIG. 3 illustrates an example of a computing environment that supports system and techniques for backing up scalable computing objects in accordance with aspects of the present disclosure.

FIG. 3 illustrates an example of a computing environment 300 that supports system and techniques for backing up scalable computing objects in accordance with aspects of the present disclosure. The computing environment 300 may implement or be implemented by aspects of the computing environment 100 and the object diagram 200 described with reference to FIGS. 1 and 2, respectively. For example, the computing environment 300 may include a computing system 305 and a DMS 310, which may be examples of the systems described herein, including with reference to FIGS. 1 and 2. Additionally, the computing system 305 may include a computing object 325, which may be an example of a computing object 205 or a computing object 210 described with reference to FIG. 2, among other types of scalable computing objects.

The DMS 310 may support scalable techniques for backing up the computing object 325. For example, the DMS 310 may determine to capture a snapshot 320 of the computing object 325 at a first time. The snapshot 320 may correspond to a metadata snapshot of the computing object 325. In some cases, the snapshot 320 may be referred to as a logical or virtual snapshot, as the snapshot 320 may comprise metadata representative of one or more other snapshots 340 as described herein. That is, the snapshot 320 may include metadata 345 that may be used to manage (e.g., generate, index, access, search, restore) one or more snapshots 340 that include data (e.g., updated data) of the computing object 325 at the first time.

The computing object 325 may include respective portions for which respective snapshots 340 may be generated. For example, the DMS 310 may identify a set of components (e.g., components 225) that each correspond to a respective portion of the computing object 325, as described with reference to FIG. 2. Based on determining to capture the snapshot 320 and in accordance with the identified components, the DMS 310 may cause (e.g., instruct) the computing system 305 to generate multiple snapshots 340 (e.g., a snapshot 340-*a* through a snapshot 340-*n*) that each correspond to a respective portion of the computing object 325 (e.g., the snapshots 340 may each be child snapshots). That is, the snapshots 340 may each include data of a respective portion of the computing object 325 at the first time (e.g., rather than generating a single snapshot 340 to include data for an entirety of the computing object 325).

To cause the computing system 305 to generate the snapshots 340, the DMS 310 may transmit snapshot signaling 330 that instructs for the computing system 305 to generate the snapshots 340. In response to the snapshot signaling 330, the computing system 305 may generate the snapshots 340. In some examples, the DMS 310 may facilitate the generation of the snapshots 340 by creating one or more compute instances 335 at the computing system 305. For example, a compute instance 335 may be a temporary compute instance (e.g., an agent of DMS 310 executed by the computing system 305) via which the DMS 310 may cause the generation of the snapshots 340. That is, the DMS 310 may cause one or more compute instances 335 to be created (e.g., initiated) at the computing system 305, and the one or more compute instances 335 may generate the snapshots 340. In some examples, a compute instance 335 may be referred to as an exotask or an exocompute task (e.g., due to being external from the DMS 310). In some examples, the snapshot signaling 330 may initiate the one or more compute instances 335 and instruct the one or more compute instances 335 to generate the snapshots 340. In some examples, the snapshot signaling 330 may instruct one or more ongoing (e.g., previously initiated) compute instances 335 to generate the snapshots 340.

In some examples, the snapshot signaling 330 may initiate one compute instance 335 per snapshot 340 to be generated. For example, the snapshot signaling 330 may initiate a compute instance 335-*a* to generate the snapshot 340-*a*, a compute instance 335-*b* to generate a snapshot 340-*b*, and so on up to a compute instance 335-*n* to generate a snapshot 340-*n*. In some other examples, the snapshot signaling 330 may initiate a single compute instance 335 that may support the generation of multiple ones of the snapshots 340 (e.g., some or all of the snapshots 340). For example, the snapshot signaling 330 may initiate and/or instruct the compute instance 335-*a* to generate the snapshots 340-*a* through 340-*n*. In some examples, the snapshot signaling 330 may support the generation of the snapshots 340 by the compute instance 335-*a* by instructing the compute instance 335-*a* to initiate a set of remote procedure calls (RPCs) (e.g., gRPCs) that may each be used to generate a respective snapshot 340. For example, an RPC may be a procedure (e.g., software communication protocol) via which a compute instance 335 may cause a procedure to execute in a different address space but which is coded as if it were a local procedure call. That is, the compute instance 335 may execute an RPC to request performance of a service by another device (e.g., without including explicit coding instructions to perform the service). Accordingly, in response to the snapshot signaling 330, the compute instance 335-*a* may initiate a set of RPCs that request for the computing system 305 to generate respective snapshots 340.

After or concurrent with the generation of the snapshots 340, the snapshots 340 may be stored to a storage entity 315 included in the computing environment 300. For example, the storage entity 315 may be an example of a cloud environment, a data center, or some other storage entity (e.g., a storage node 185, a data storage device 130) with which the DMS 310 may communicate (e.g., via a network 120). Although the storage entity 315 is illustrated as being separate from the DMS 310, in some examples, the DMS 310 may include the storage entity 315. The generated snapshots 340 may be stored to the storage entity 315. In some examples, the one or more compute instances 335 (e.g., based on instructions received from the DMS 310) may cause (e.g., perform) the storage of the generated snapshots 340 to the storage entity 315.

In some examples, the DMS 310 may assign a set of identifiers to the snapshots 340 in accordance with the identification of the components corresponding to the respective portions of the computing object 325. For example, a snapshot 340 may be generated for each identified component (e.g., corresponding to a respective portion of the computing object 325 that include data that has been updated since a previous snapshot 340 of the respective portion was captured), and the DMS 310 may assign a respective identifier to each component such that a snapshot 340 of the component may also be assigned the respective identifier. In the example of FIG. 3, an ID-a may be assigned to the snapshot 340-*a*, an ID-b may be assigned to the snapshot 340-*b*, and so on up through an ID-n being assigned to the snapshot 340-*n*. In some examples, the set of identifiers may be included in the snapshot signaling 330, and a respective identifier may be included in respective metadata for (e.g., included in) each snapshot 340.

The DMS 310 may generate the snapshot 320 such that there is a one-to-multiple mapping between the snapshot 320 and the snapshots 340. That is, each snapshot 320 generated by the DMS 310 at a respective time (e.g., in accordance with a service level agreement (SLA) between the DMS 310 and the computing system 305) may map to a respective set of multiple snapshots 340 generated at the respective time. Thus, multiple snapshots 320 may be generated by the DMS 310 (each of the multiple snapshots 320 corresponding to a different respective time in accordance with the SLA), and thus there may be multiple sets of snapshots 340, which each set of snapshots 340 corresponding to a different one of the snapshots 320. To map to the snapshots 340, the snapshot 320 may include the metadata 345. The metadata 345 may include the set of identifiers assigned to the snapshots 340 (e.g., ID-a through ID-n). The metadata 345 may also include an identifier of the snapshot 320, which may be a snapshot number. For example, the metadata 345 may include an ID-X corresponding to the identifier of the snapshot 320. The IDs of the snapshots 340 included in the metadata 345 may map to the identifier of the snapshot 320. Accordingly, the metadata 345 may indicate that the snapshots 340 corresponding to the snapshot 320 are the snapshots 340-*a* through 340-*n* based on the including the IDs. Thus, if referencing the snapshot 320 captured at the first time and having the ID-X, the DMS 310 may determine that the snapshots 340-*a* through 340-*n* include the data (e.g., updated data) of the computing object 325 captured at the first time.

Because of the one-to-multiple mapping of snapshots 320 to snapshots 340, it may appear (e.g., via a user interface associated with the DMS 310, via a user interface associated with the computing system 305, or both) as if a single snapshot 340 of the computing object 325 was generated at the first time. For example, the generation of multiple snapshots 340 (e.g., child snapshots) in association with generating the snapshot 320 may be transparent to a user of the computing system 305, a user of the DMS 310, or both. Instead, the user may see that the snapshot 320 was generated at the first time. In this way, snapshots 320 may be generated, for example, in accordance with the SLA, and the DMS 310 may facilitate reduced latency and complexity management of the data captured in association with generating the snapshots 320 by causing the generation of respective sets of snapshots 340.

For example, a rate at which an individual snapshot 340 is generated may be limited. Accordingly, the greater the quantity of data captured by a given snapshot 340, the greater the time taken to generate the snapshot 340. As such, generating a single snapshot 340 to capture data of the computing object 325 at a particular point in time may be slower than generating multiple snapshots 340 that each capture a respective subset of the data of the computing object 325 at the particular point in time. Thus, because the snapshots 340 may generated in parallel (e.g., concurrently), the generating the snapshots 340-*a* through 340-*n* corresponding to the snapshot 320 may reduce a latency at which the computing object 325 is backed up at the first time.

Additionally or alternatively, the DMS 310 may determine that generation of one or more of the snapshots 340 has failed. For example, the DMS 310 may track the completion of the generation of each snapshot 340. In some examples, the one or more compute instances 335 may track the completion of the snapshots 340 and may indicate whether one or more of the snapshots 340 fails to be generated to the DMS 310. In response to a snapshot 340 being successfully generated, the DMS 310 may mark that the snapshot 340 has been completed (e.g., committed). In response to each of the snapshots 340 being successfully generated, the DMS 310 may mark that the snapshot 320 has been completed. The DMS 310 may transmit retry signaling 350 based on one or more of the snapshots 340 failing to be generated. The retry signaling 350 may instruct the computing system 305 to retry generation of the one or more snapshots 340 that failed to be generated.

The ability of the DMS 310 to retry generation of subsets of snapshots 340 that fail may improve efficiency of backing up the computing object 325. For example, the retry signaling 350 may be specific to a subset of snapshots 340 that failed to be generated and exclude instructions to generate snapshots 340 for which generation was successful or is ongoing. That is, snapshot generation may be re-attempted for those snapshots 340 that failed to be generated, while the snapshots 340 that were successfully generated or whose generation is ongoing may be excluded from the re-attempted generation. In other words, snapshot generation for each component may be independently managed and resumable (e.g., reattempted) by the DMS 310. This may provide increased flexibility and reduced latency of the snapshot generation, for example, relative to if a single snapshot 340 were used to capture the data of the computing object 325 at the first time and generation of the single snapshot 340 failed.

In some examples, the DMS 310 may transmit index signaling 355 to the computing system 305 that instructs the computing system 305 to generate or update a set of index files corresponding to the snapshots 340. In response to the index signaling 355, the computing system 305 (e.g., the compute instance(s) 335) may generate or update the set of index files. Additional details regarding the index signaling 355 and the generation or updating of the set of index files are included with reference to FIGS. 4A and 4B below.

The DMS 310 may support the restoration (e.g., recovery) of the computing object 325 (e.g., one or more portions of the computing object 325) using the snapshots 340. For example, the DMS 310 may determine to restore one or more portions of the computing object 325 (e.g., in response to a request by the user of the computing system 305). Using the snapshot 320, the DMS 310 may determine one or more of the snapshots 340-a through 340-n corresponding to the one or more portions of the computing object 325. For example, the DMS 310 may use the metadata 345 to identify the one or more snapshots 340 that include the data requested to be restored. The DMS 310 may use the identified snapshots 340 to restore the one or more portions of the computing object 325 to a target location, such as the computing system 305 or some other storage entity. In some examples, the DMS 310 may transmit restore signaling 360, for example, to the storage entity 315 that instructs the storage entity 315 to restore the one or more portions of the computing object 325 to the target location. In some examples, the one or more portions of the computing object 325 may be concurrently restored to the target location using the identified snapshots 340.

Figure 4A:
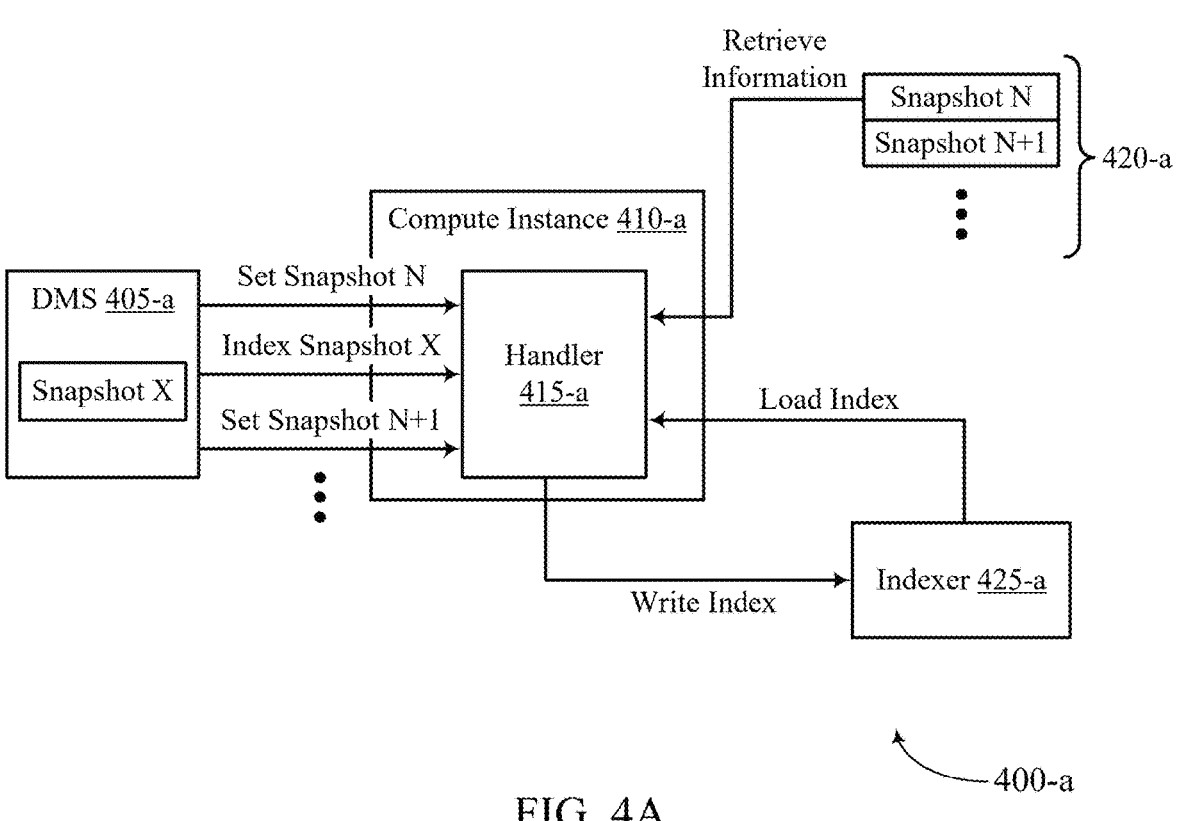
FIGS. 4A and 4B illustrates examples of computing environments that support system and techniques for backing up scalable computing objects in accordance with aspects of the present disclosure.
Figure 4B:
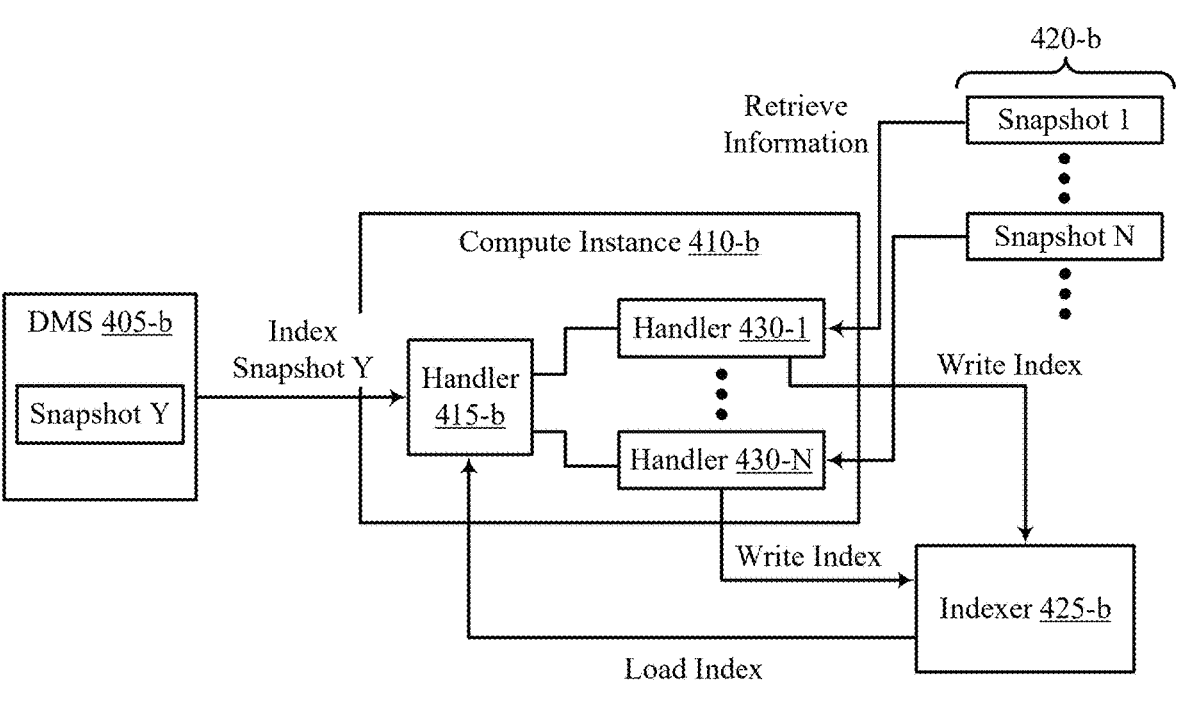

FIGS. 4A and 4B illustrate examples of computing environments 400-b and 400-b that supports system and techniques for backing up scalable computing objects in accordance with aspects of the present disclosure. The computing environments 400 may implement or be implemented by aspects of the computing environments 100 or 300 and the object diagram 200 described with reference to FIGS. 1 through 3. For example, the computing environments 400 may include DMSs 405, which may be examples of the systems described herein, including with reference to FIGS. 1 through 3. Additionally, the computing environments 400 may include compute instances 410, which may be an example of a compute instance 335 described with reference to FIG. 3. The computing environments 400 may support the indexing of child snapshots of components of a computing object (e.g., snapshots 340 of a computing object 325), for example, to support search operations, restore operations, and file management, among other operations.

The computing environments 400 may include an indexer 425, which may be an example of a storage entity (e.g., a storage location within a storage entity, such as a storage node 185, among others) that stores index files associated with snapshots. In some examples, the index files may be used in search operations, restore operations, or a combination thereof. For example, an index file may include information (e.g., metadata) associated with data captured by one or more snapshots 420. For example, an index file may include names of files included in the one or more snapshots 420, times at which the files were created or updated, sizes of the files (e.g., quantities of data included in the files), sizes of the snapshots 420, or a combination thereof, among other types of metadata that may be stored by an index file. As such, the index file may be accessed during a search operation to determine the contents of one or more corresponding snapshots 420, for example, without directly accessing (e.g., recovering) the data. This may support a user to determine whether to restore data captured by particular snapshots 420.

In the example of FIG. 4A, the computing environment 400-a may include a DMS 405-a, a compute instance 410-a, an indexer 425-a, and a set of snapshots 420-a to be indexed. The snapshots 420-a may correspond to child snapshots mapped to by a snapshot X generated by the DMS 405-a (e.g., metadata included in the snapshot X may include identifiers of the snapshots 420-a). The DMS 405-a may facilitate the indexing of the snapshots 420-a. In some examples, the snapshots 420-a may be snapshots of a hierarchical computing object, such as a computing object 205. To facilitate indexing, the DMS 405-a may transmit index signaling (e.g., index signaling 355) to the compute instance 410-a that instructs the compute instance 410-a to set a snapshot N of the snapshots 420-a. For instance, the index signaling may instruct a handler 415-a of the compute instance 410-a (e.g., a computing entity of the compute instance configured to manage the indexing the snapshots 420-a) to retrieve an index file corresponding to the snapshot N from the indexer 425-a such that the index file may be updated. Accordingly, the index file may be loaded to the handler 415-a from the indexer 425-a based on the index file. In some cases, no index file may yet exist for the snapshot N, and a new index file may be generated and loaded to the handler 415-a.

The index signaling (e.g., same or additional index signaling) may indicate for the handler 415-a to index snapshot X. For example, the index signaling may instruct the handler 415-a to retrieve information associated with the snapshot X. In some examples, the index signaling may include one or more identifiers of the snapshots 420-a included in metadata of the snapshot X. Because the snapshot N is set, the handler 415-a may retrieve information associated with the snapshot N, such as metadata of the snapshot N or the snapshot N, to determine changes to be indexed. For example, the handler 415-a may use the index file of the snapshot N and the information retrieved to determine changes to a portion of a computing object corresponding to the snapshot and made between a previous snapshot of the portion and the snapshot N. That is, the handler 415-a may determine updates to the portion of the computing object captured by the snapshot N. The handler 415-a may update the index file in accordance with the determined updates and write the updated index file to the indexer 425-a.

The DMS 405-a may transmit additional index signaling to support the indexing of each of the snapshots 420-a. For example, the DMS 405-a may similarly transmit index signaling to set a snapshot N+1 of the snapshots 420-a in response to which an index file for the snapshot N+1 may be loaded to the handler 415-a. The index signaling may instruct the handler 415-a to index snapshot X, and because the index file for snapshot N+1 is loaded to the handler 415-a, the handler 415-a may retrieve information associated with the snapshot N+1, determine the updates to a portion of the computing object captured by the snapshot N+1, update the index file for snapshot N+1 accordingly, and write the index file for snapshot N+1 to the indexer 425-a. The DMS 405-a may continue to index remaining snapshots 420-a in this manner.

In the example of FIG. 4B, the computing environment 400-b may include a DMS 405-b, a compute instance 410-b, an indexer 425-b, and a set of snapshots 420-b to be indexed. The snapshots 420-b may correspond to child snapshots mapped to be a snapshot Y generated by the DMS 405-b. In some examples, the snapshots 420-b may be snapshots of a computing object of a group-based communication platform that includes shared communication channels, such as a computing object 210. To facilitate indexing, the DMS 405-b may transmit index signaling (e.g., index signaling 355) to the compute instance 410-b that instructs the compute instance 410-*b* to index the snapshot Y. For instance, the index signaling may instruct a handler 415-*b* of the compute instance 410-*b* to index the snapshots 420-*b* mapped to by the snapshot Y. In some examples, the index signaling may include identifiers of the snapshots 420-*b* included in metadata of the snapshot Y.

In response to the index signaling, the handler 415-*b* may retrieve an index file from the indexer 425-*b* which may load the index file to the handler 415-*b*. In some examples, the index file may correspond to a subset of snapshots 420-*b*. For example, in some cases, various snapshots 420-*b* may be tightly coupled (e.g., closely related) such that searching of one snapshot 420-*b* may often be paired with one or more other snapshots 420-*b*. For example, snapshots 420-*b* corresponding to a same shared communication channel of the computing object (e.g., a conversation object 240 and a file object 245 of a same shared communication channel) may be tightly coupled such that searching information associated with the shared communication channel may result in accessing index information of multiple of the corresponding snapshots 420-*b*. In the example of FIG. 4B, the handler 415-*b* may determine that a snapshot 1 through a snapshot N of the snapshots 420-*b* correspond to the retrieved index file. That is, the handler 415-*b* may determine that snapshot 1 through snapshot N are tightly coupled and that updates captured by these snapshots are to be written to a same index file.

The handler 415-*b* may retrieve information associated with the snapshots 1 through N to determine the updates to respective portions of the computing object captured by these snapshots. The handler 415-*b* may update the index file accordingly and write the index file to the indexer 425-*b*. In some examples, the handler 415-*b* may use child handlers 430 to support updating the index file. For example, a respective child handler 430 may retrieve information associated with a respective snapshot 420-*b* to determine the updates captured by the respective snapshot 420-*b* and write the respective updates to the index file. For instance, a child handler 430-1 may retrieve information associated with the snapshot 1 and determine the updates captured by the snapshot 1 based on the information. The child handler 430-1 may update a portion of the index file corresponding to the snapshot 1. Other child handlers 430 up through a child handler 430-N may similarly retrieve information associated with corresponding snapshots 420-*b* and update corresponding portions of the index file accordingly. The updated index file may then be written to the indexer 425-*b*.

In some examples, handler 415-*b* may skip loading the index file from the indexer 425-*b*. Instead, the handler 415-*b* may determine the snapshots 420-*b* that are tightly coupled and cause corresponding child handlers 430 to retrieve associated snapshot information, determine the updates captured by the determined snapshots 420-*b*, and write the updates to the index file stored at the indexer 425-*b*.

The handler 415-*b* may continue to index the snapshots 420-*b* until the snapshots 420-*b* mapped to be the snapshot Y are indexed.

Figure 5:
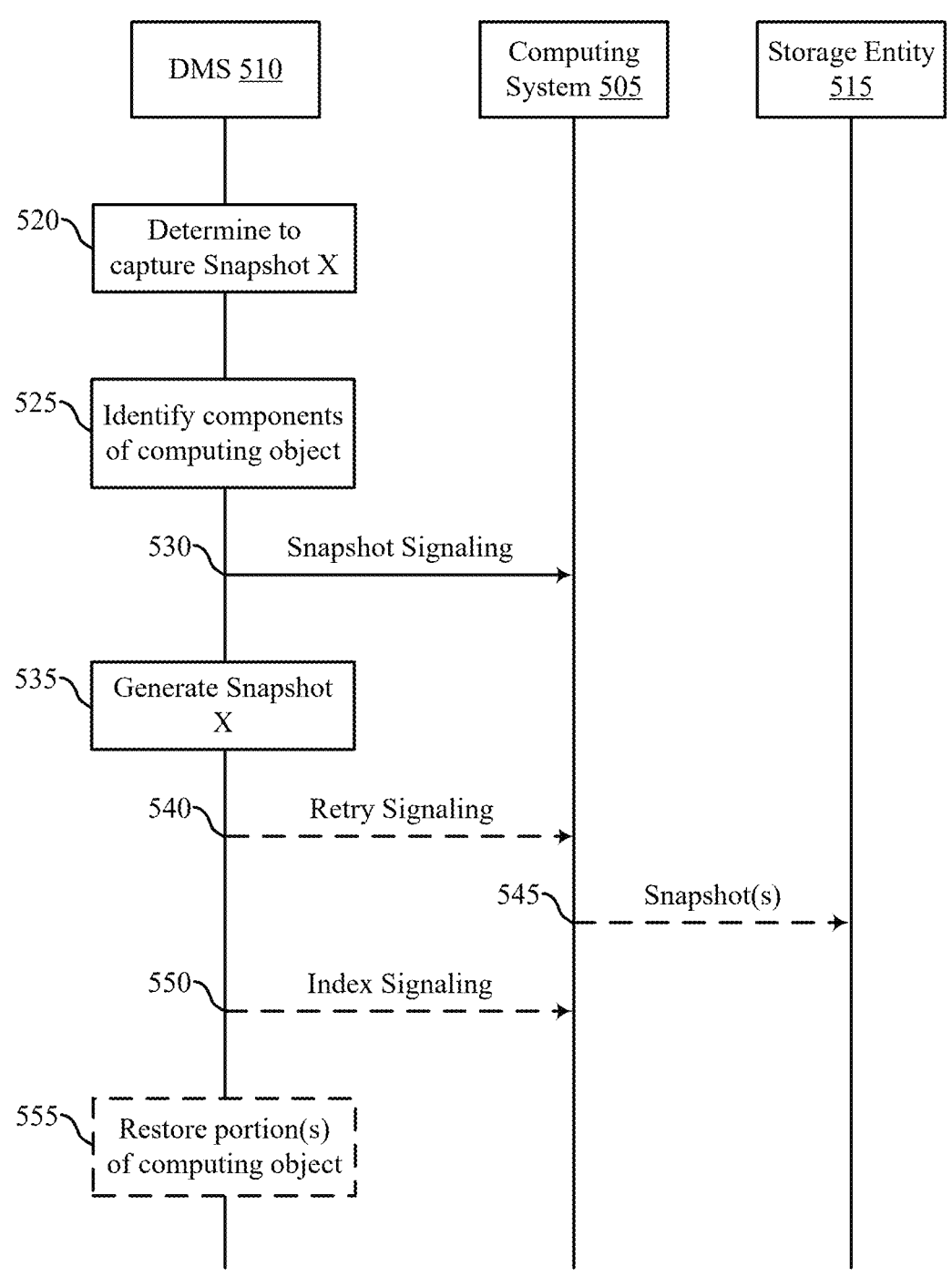
FIG. 5 illustrates an example of a process flow that supports system and techniques for backing up scalable computing objects in accordance with aspects of the present disclosure.

FIG. 5 illustrates an example of a process flow 500 that supports system and techniques for backing up scalable computing objects in accordance with aspects of the present disclosure. The process flow 500 may implement or be implemented by aspects of the computing environments described with reference to FIGS. 1 through 4B. For example, the process flow 500 may be implemented by a computing system 505, a DMS 510, and a storage entity 515 to support the scalable and efficient backup of computing objects.

The computing system 505 and the DMS 510 may be examples of the corresponding systems described with reference to FIGS. 1 through 4B. The storage entity 515 may be an example of a storage entity 315 described with reference to FIG. 3. In the following description of the process flow 500, the operations between the computing system 505, the DMS 510, and the storage entity 515 may be communicated in a different order than the example order shown, or the operations performed by the computing system 505, the DMS 510, and the storage entity 515 may be performed in different orders or at different times. Some operations may also be omitted from the process flow 500, and other operations may be added to the process flow 500. Further, although some operations or signaling may be shown to occur at different times for discussion purposes, these operations may actually occur at the same time.

At 520, the DMS 510 may determine to capture a snapshot X of a computing object within the computing system 505. For example, the DMS 510 may be configured to periodically capture snapshots of the computing object (e.g., in accordance with an SLA between the DMS 510 and the computing system 505). Accordingly, the DMS 510 may determine to capture (e.g., generate) the snapshot X at a first time in accordance with the configured periodicity.

At 525, the DMS 510 may identify components of the computing object. For example, a component of the computing object may be a portion of the computing object for which a respective child snapshot is to be generated in associated with the capture of the snapshot X. In some examples, the DMS 510 may determine how to divide (e.g., partition) the portions of the computing objects into respective components. In some examples, the portions of the computing object may be divided in accordance with API division to access the portions of the computing object. That is, portions of the computing object accessed via a same API may be included in a same component, and portions of the computing object accessed via a different API be divided into different components. In some examples, the portions of the computing object may be divided based on object type. For example, a document library, a web page, a public communication channel of a group-based communication platform, a set of files associated with the public communication channel, a private communication channel of the group-based communication platform, a set of files associated with the private communication channel, or metadata associated with one or more other portions of the computing object may be divided into different components.

At 530, the DMS 510 may transmit snapshot signaling to the computing system 505. The snapshot signaling may instruct the computing system 505 to generate child snapshots of the computing object in accordance with the component identification. That is, the computing system 505 may generate a child snapshot for each component of the computing object. In some examples, the snapshot signaling may initiate one or more compute instances at the computing system 505 and instruct the compute instances to generate the child snapshots.

At 535, the DMS 510 may generate the snapshot X to support the management of the child snapshots. The DMS 510 may generate the snapshot X directly (e.g., at the DMS 510) or by sending an instruction to the computing system 505 that instructs the computing system 505 to generate the snapshot X (e.g., instructs the computing system 505 to generate the snapshot X at the computing system 505). For example, the snapshot X may include metadata including an identifier of the snapshot X and respective identifiers of the child snapshots.

At 540, the DMS 510 may transmit retry signaling to the computing system 505. For example, the DMS 510 may determine that the generation of one or more of the child snapshots has failed. The retry signaling may instruct the computing system 505 to retry generation of the one or more child snapshots. The retry signaling may be specific to the one or more child snapshots. That is, the retry signaling may exclude instructions associated with retrying generate of other child snapshots for which generation was successful or is ongoing.

At 545, the child snapshots may be stored to the storage entity 515. For example, after the child snapshots are generated, the computing system 505 (e.g., the one or more compute instances) may transmit the child snapshots to the storage entity 515 for storage. In some examples, the storage entity 515 may be included in the DMS 510.

At 550, the DMS 510 may transmit index signaling to the computing system 505 that instructs the computing system to generate or update a set of index files corresponding to the child snapshots and associated with the snapshot X. For example, the index signaling may instruct a compute instance at the computing system 505 to determine changes to data captured by the child snapshots and to update corresponding index files to reflect the determined changes. In some examples, if an index file corresponding to one or more of the child snapshots has not yet been created, the index signaling may instruct the compute instance (e.g., or an indexer) to generate and populate the index file. In some examples, an index file may correspond to multiple child snapshots.

At 555, the DMS 510 may facilitate the restoration of one or more portions of the computing object using the snapshot X and the child snapshots. For example, the DMS 510 may determine the one or more portions of the computing object to restore (e.g., based on a request from a user of the computing system 505). The DMS 510 may determine one or more child snapshots corresponding to the one or more portions of the computing object (e.g., using the snapshot X, using one or more corresponding index files). The DMS 510 may use the one or more corresponding child snapshots to restore the one or more portions of the computing object to a target location (e.g., the computing system 505, some other storage entity accessible by the user of the computing system 505). The DMS 510 may also support concurrent restoration of multiple portions of the computing object using multiple child snapshots. For example, the DMS 510 may restore a first portion of the computing object using a first child snapshot and concurrently restore a second portion of the computing object using a second child snapshot.

Figure 6:
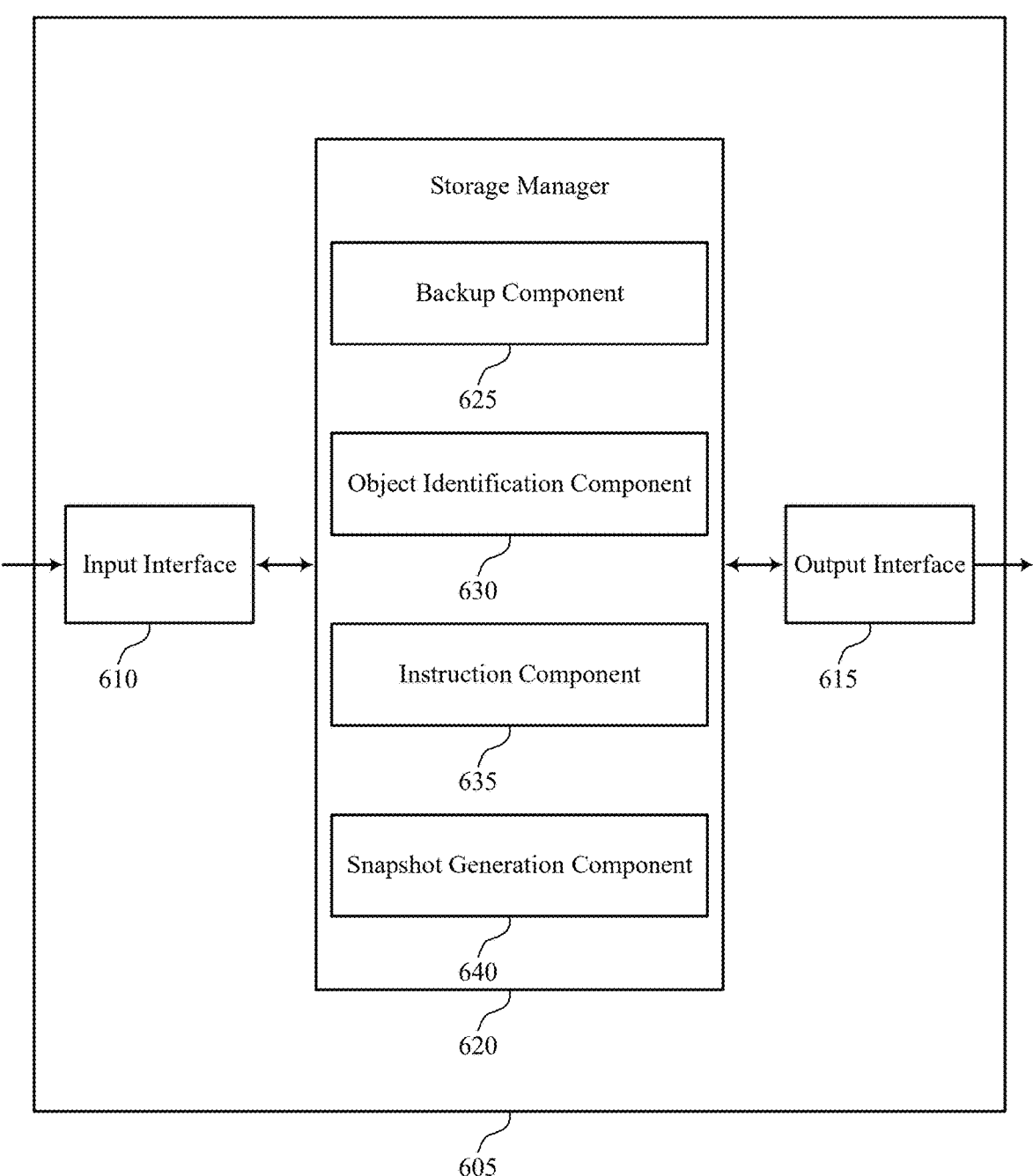
FIG. 6 illustrates a block diagram of an apparatus that supports system and techniques for backing up scalable computing objects in accordance with aspects of the present disclosure.

FIG. 6 illustrates a block diagram 600 of a system 605 that supports system and techniques for backing up scalable computing objects in accordance with aspects of the present disclosure. In some examples, the system 605 may be an example of aspects of one or more components described with reference to FIG. 1, such as a DMS 110. The system 605 may include an input interface 610, an output interface 615, and a storage manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the storage manager 620 to support storage tiering for computing system snapshots. In some cases, the input interface 610 may be a component of a network interface 815 as described with reference to FIG. 8.

The output interface 615 may manage output signaling for the system 605. For example, the output interface 615 may receive signaling from other components of the system 605, such as the storage manager 620, and may transmit such output signaling corresponding to (e.g., representative of or otherwise based on) such signaling to other systems or devices. In some cases, the output interface 615 may be a component of a network interface 815 as described with reference to FIG. 8.

The storage manager 620 may include a backup component 625, an object identification component 630, an instruction component 635, a snapshot generation component 640, or any combination thereof. In some examples, the storage manager 620, or various components thereof, may be configured to perform various operations (e.g., receiving, monitoring, transmitting) using or otherwise in cooperation with the input interface 610, the output interface 615, or both. For example, the storage manager 620 may receive information from the input interface 610, send information to the output interface 615, or be integrated in combination with the input interface 610, the output interface 615, or both to receive information, transmit information, or perform various other operations as described herein.

The storage manager 620 may support data management in accordance with examples as disclosed herein. The backup component 625 may be configured as or otherwise support a means for determining, by a DMS, to capture a first snapshot of a computing object within a computing system. The object identification component 630 may be configured as or otherwise support a means for identifying, by the DMS, a set of multiple components corresponding to respective portions of the computing object. The instruction component 635 may be configured as or otherwise support a means for transmitting, from the DMS to the computing system, signaling that instructs the computing system to generate a set of snapshots including respective snapshots of the components. The snapshot generation component 640 may be configured as or otherwise support a means for generating the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system.

Figure 7:
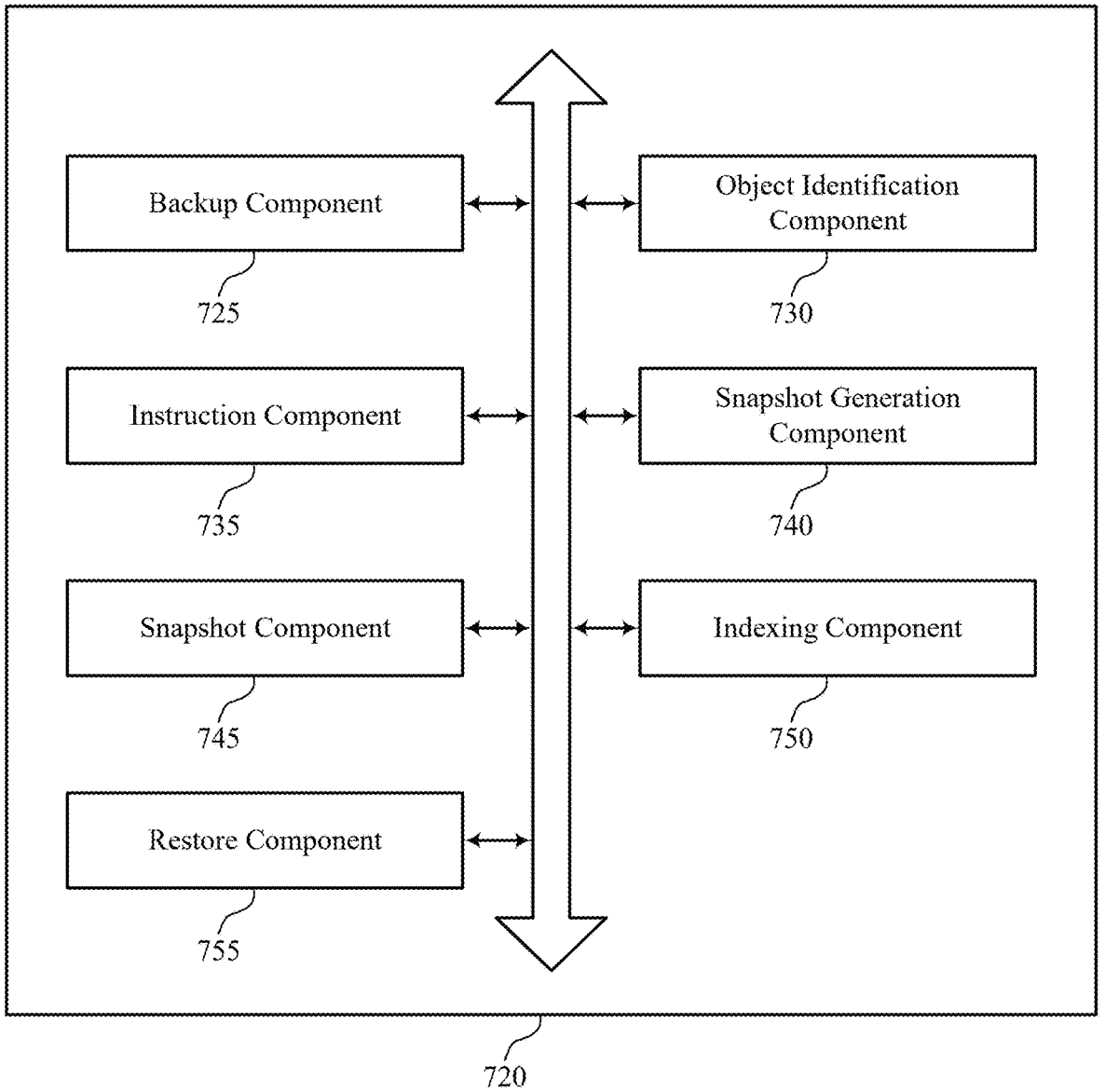
FIG. 7 illustrates a block diagram of a storage manager that supports system and techniques for backing up scalable computing objects in accordance with aspects of the present disclosure.

FIG. 7 illustrates a block diagram 700 of a storage manager 720 that supports system and techniques for backing up scalable computing objects in accordance with aspects of the present disclosure. The storage manager 720 may be an example of aspects of a storage manager 620 as described herein. The storage manager 720, or various components thereof, may be an example of means for performing various aspects of system and techniques for backing up scalable computing objects as described herein. For example, the storage manager 720 may include a backup component 725, an object identification component 730, an instruction component 735, a snapshot generation component 740, a snapshot component 745, an indexing component 750, a restore component 755, or any combination thereof. Each of these components may communicate, directly or indirectly, with one another (e.g., via one or more buses, communications links, communications interfaces, or any combination thereof).

The storage manager 720 may support data management in accordance with examples as disclosed herein. The backup component 725 may be configured as or otherwise support a means for determining, by a DMS, to capture a first snapshot of a computing object within a computing system. The object identification component 730 may be configured as or otherwise support a means for identifying, by the DMS, a set of multiple components corresponding to respective portions of the computing object. The instruction component 735 may be configured as or otherwise support a means for transmitting, from the DMS to the computing system, signaling that instructs the computing system to generate a set of snapshots including respective snapshots of the components. The snapshot generation component 740 may be configured as or otherwise support a means for generating the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system.

In some examples, to support transmitting the signaling that instructs the computing system to generate the set of snapshots, the instruction component 735 may be configured as or otherwise support a means for transmitting signaling to initiate a compute instance at the computing system, the compute instance for generating the set of snapshots.

In some examples, the signaling instructs the compute instance to initiate a set of RPCs, each RPC for generating a respective snapshot of the set of snapshots.

In some examples, the signaling initiates a set of compute instances at the computing system, the signaling instructing each compute instance of the set of compute instances to generate a respective snapshot of the set of snapshots.

In some examples, the snapshot component 745 may be configured as or otherwise support a means for assigning, by the DMS, the set of identifiers to the set of snapshots in accordance with the identification of the set of multiple components, where the signaling includes the set of identifiers for inclusion in the metadata for the set of snapshots.

In some examples, the indexing component 750 may be configured as or otherwise support a means for transmitting, by the DMS, second signaling that instructs the computing system to generate or update a set of index files corresponding to the set of snapshots and associated with the first snapshot.

In some examples, a first index file of the set of index files corresponds to a first subset of snapshots of the set of snapshots, the first subset of snapshots including a set of multiple snapshots.

In some examples, the backup component 725 may be configured as or otherwise support a means for determining, by the DMS, that a subset of snapshots of the set of snapshots failed to be generated. In some examples, the instruction component 735 may be configured as or otherwise support a means for transmitting, by the DMS, second signaling that instructs the computing system to retry generation of the subset of snapshots.

In some examples, the second signaling is specific to the subset of snapshots and excludes instructions associated with a second subset of snapshots of the set of snapshots for which generation was successful or is ongoing.

In some examples, the restore component 755 may be configured as or otherwise support a means for determining to restore one or more portions of the computing object based on the set of snapshots. In some examples, the snapshot component 745 may be configured as or otherwise support a means for determining one or more snapshots of the set of snapshots corresponding to the one or more portions of the computing object based on the first snapshot. In some examples, the restore component 755 may be configured as or otherwise support a means for restoring the one or more portions of the computing object using the one or more snapshots.

In some examples, to support restoring the one or more portions of the computing object, the restore component 755 may be configured as or otherwise support a means for restoring a first portion of the computing object using a first snapshot of the one or more snapshots. In some examples, to support restoring the one or more portions of the computing object, the restore component 755 may be configured as or otherwise support a means for concurrently restoring a second portion of the computing object using a second snapshot of the one or more snapshots.

In some examples, a respective portion of the computing object corresponds to a respective resource of the computing object that is accessed via a respective API.

In some examples, a respective portion of the computing object corresponds to a document library, a web page, a public communication channel of a group-based communication platform, a set of files associated with the public communication channel, a private communication channel of the group-based communication platform, a set of files associated with the private communication channel, or metadata associated with one or more other portions of the computing object.

In some examples, the metadata associated with the one or more other portions of the computing object indicates a hierarchical relationship between the one or more other portions of the computing object.

Figure 8:
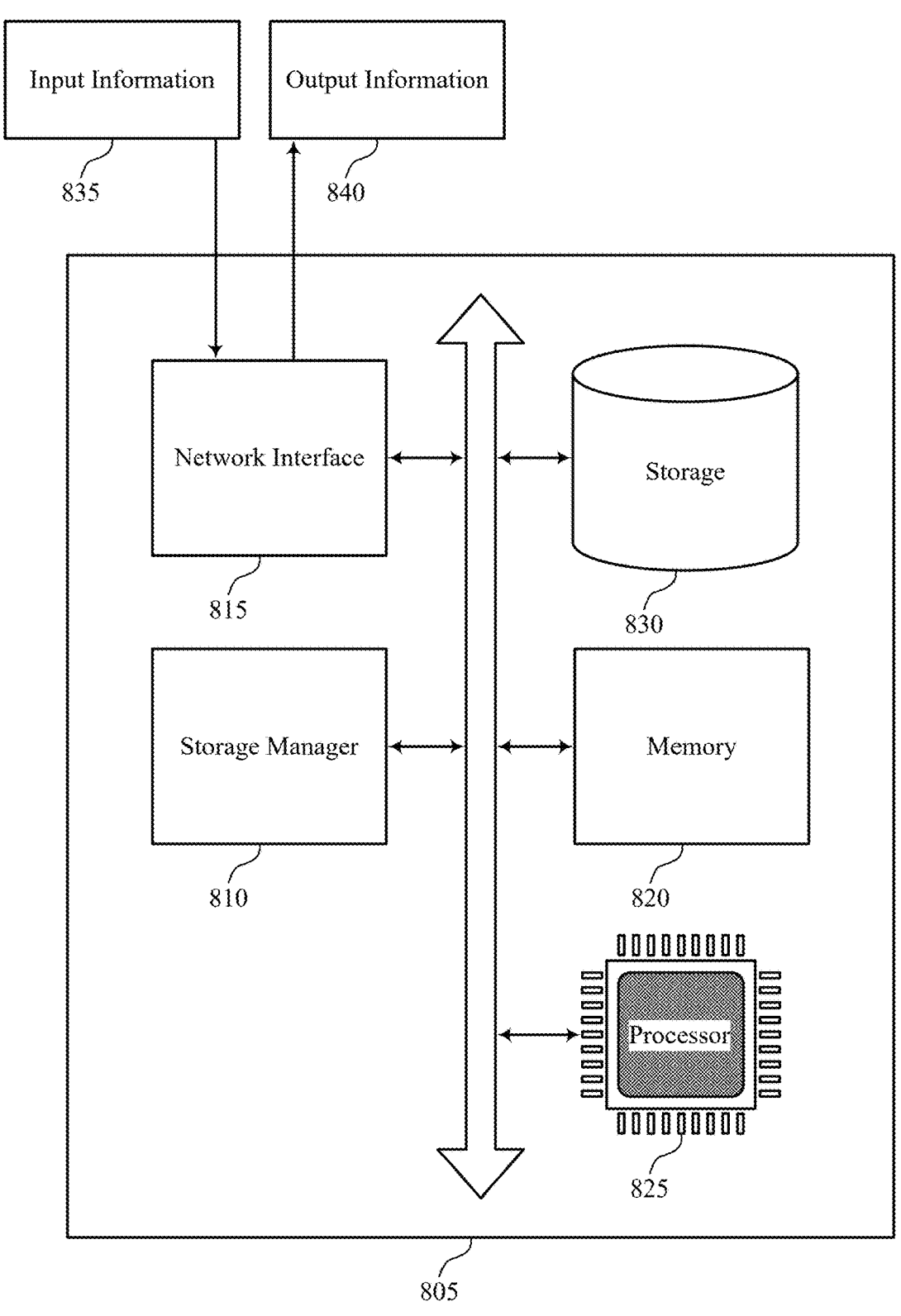
FIG. 8 illustrates a diagram of a system including a device that supports system and techniques for backing up scalable computing objects in accordance with aspects of the present disclosure.

FIG. 8 illustrates a diagram of a system 800 including a system 805 that supports intelligent protection of computing snapshots in accordance with aspects of the present disclosure. The system 805 may be an example of or include the components of a system 605 as described herein. The system 805 may include components for data management, including components such as a storage manager 810, a network interface 815, a memory 820, a processor 825, and storage 830. These components may be in electronic communication or otherwise coupled with each other (e.g., operatively, communicatively, functionally, electronically, electrically; via one or more buses, communications links, communications interfaces, or any combination thereof). Additionally, the components of the system 805 may comprise corresponding physical components or may be implemented as corresponding virtual components (e.g., components of one or more virtual machines). In some examples, the system 805 may be an example of aspects of one or more components described with reference to FIG. 1, such as a DMS 110.

The network interface 815 may enable the system 805 to exchange information (e.g., input information 835, output information 840, or both) with other systems or devices (not shown). For example, the network interface 815 may enable the system 805 to connect to a network (e.g., a network 120 as described herein). The network interface 815 may include one or more wireless network interfaces, one or more wired network interfaces, or any combination thereof. In some examples, the network interface 815 may be an example of may be an example of aspects of one or more components described with reference to FIG. 1, such as one or more network interfaces 165.

Memory 820 may include RAM, ROM, or both. The memory 820 may store computer-readable, computer-executable software including instructions that, when executed, cause the processor 825 to perform various functions described herein. In some cases, the memory 820 may contain, among other things, a basic input/output system (BIOS), which may control basic hardware or software operation such as the interaction with peripheral components or devices. In some cases, the memory 820 may be an example of aspects of one or more components described with reference to FIG. 1, such as one or more memories 175.

The processor 825 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 825 may be configured to execute computer-readable instructions stored in a memory 820 to perform various functions (e.g., functions or tasks supporting storage tiering for computing system snapshots). Though a single processor 825 is depicted in the example of FIG. 8, it is to be understood that the system 805 may include any quantity of one or more of processors 825 and that a group of processors 825 may collectively perform one or more functions ascribed herein to a processor, such as the processor 825. In some cases, the processor 825 may be an example of aspects of one or more components described with reference to FIG. 1, such as one or more processors 170.

Storage 830 may be configured to store data that is generated, processed, stored, or otherwise used by the system 805. In some cases, the storage 830 may include one or more HDDs, one or more SDDs, or both. In some examples, the storage 830 may be an example of a single database, a distributed database, multiple distributed databases, a data store, a data lake, or an emergency backup database. In some examples, the storage 830 may be an example of one or more components described with reference to FIG. 1, such as one or more network disks 180.

The storage manager 810 may support data management in accordance with examples as disclosed herein. For example, the storage manager 810 may be configured as or otherwise support a means for determining, by a DMS, to capture a first snapshot of a computing object within a computing system. The storage manager 810 may be configured as or otherwise support a means for identifying, by the DMS, a set of multiple components corresponding to respective portions of the computing object. The storage manager 810 may be configured as or otherwise support a means for transmitting, from the DMS to the computing system, signaling that instructs the computing system to generate a set of snapshots including respective snapshots of the components. The storage manager 810 may be configured as or otherwise support a means for generating the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system.

By including or configuring the storage manager 810 in accordance with examples as described herein, the system 805 may support techniques for.

FIG. 9 illustrates a flowchart showing a method 900 that supports system and techniques for backing up scalable computing objects in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include determining, by a DMS, to capture a first snapshot of a computing object within a computing system. The operations of 905 may be performed in accordance with examples as disclosed herein. In some examples, aspects of the operations of 905 may be performed by a backup component 725 as described with reference to FIG. 7.

At 910, the method may include identifying, by the DMS, a set of multiple components corresponding to respective portions of the computing object. The operations of 910 may be performed in accordance with examples as disclosed herein. In some examples, aspects of the operations of 910 may be performed by an object identification component 730 as described with reference to FIG. 7.

At 915, the method may include transmitting, from the DMS to the computing system, signaling that instructs the computing system to generate a set of snapshots including respective snapshots of the components. The operations of 915 may be performed in accordance with examples as disclosed herein. In some examples, aspects of the operations of 915 may be performed by an instruction component 735 as described with reference to FIG. 7.

At 920, the method may include generating the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system. The operations of 920 may be performed in accordance with examples as disclosed herein. In some examples, aspects of the operations of 920 may be performed by a snapshot generation component 740 as described with reference to FIG. 7.

FIG. 10 illustrates a flowchart showing a method 1000 that supports system and techniques for backing up scalable computing objects in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include determining, by a DMS, to capture a first snapshot of a computing object within a computing system. The operations of 1005 may be performed in accordance with examples as disclosed herein. In some examples, aspects of the operations of 1005 may be performed by a backup component 725 as described with reference to FIG. 7.

At 1010, the method may include identifying, by the DMS, a set of multiple components corresponding to respective portions of the computing object. The operations of 1010 may be performed in accordance with examples as disclosed herein. In some examples, aspects of the operations of 1010 may be performed by an object identification component 730 as described with reference to FIG. 7.

At 1015, the method may include transmitting, from the DMS to the computing system, signaling that instructs the computing system to generate a set of snapshots including respective snapshots of the components. In some examples, transmitting the signaling that instructs the computing system to generate the set of snapshots may include transmitting signaling to initiate a compute instance at the computing system, the compute instance for generating the set of snapshots. The operations of 1015 may be performed in accordance with examples as disclosed herein. In some examples, aspects of the operations of 1015 may be performed by an instruction component 735 as described with reference to FIG. 7.

At 1020, the method may include generating the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system. The operations of 1020 may be performed in accordance with examples as disclosed herein. In some examples, aspects of the operations of 1020 may be performed by a snapshot generation component 740 as described with reference to FIG. 7.

FIG. 11 illustrates a flowchart showing a method 1100 that supports system and techniques for backing up scalable computing objects in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include determining, by a DMS, to capture a first snapshot of a computing object within a computing system. The operations of 1105 may be performed in accordance with examples as disclosed herein. In some examples, aspects of the operations of 1105 may be performed by a backup component 725 as described with reference to FIG. 7.

At 1110, the method may include identifying, by the DMS, a set of multiple components corresponding to respective portions of the computing object. The operations of 1110 may be performed in accordance with examples as disclosed herein. In some examples, aspects of the operations of 1110 may be performed by an object identification component 730 as described with reference to FIG. 7.

At 1115, the method may include transmitting, from the DMS to the computing system, signaling that instructs the computing system to generate a set of snapshots including respective snapshots of the components. The operations of 1115 may be performed in accordance with examples as disclosed herein. In some examples, aspects of the operations of 1115 may be performed by an instruction component 735 as described with reference to FIG. 7.

At 1120, the method may include generating the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system. The operations of 1120 may be performed in accordance with examples as disclosed herein. In some examples, aspects of the operations of 1120 may be performed by a snapshot generation component 740 as described with reference to FIG. 7.

At 1125, the method may include transmitting, by the DMS, second signaling that instructs the computing system to generate or update a set of index files corresponding to the set of snapshots and associated with the first snapshot. The operations of 1125 may be performed in accordance with examples as disclosed herein. In some examples, aspects of the operations of 1125 may be performed by an indexing component 750 as described with reference to FIG. 7.

FIG. 12 illustrates a flowchart showing a method 1200 that supports system and techniques for backing up scalable computing objects in accordance with aspects of the present disclosure. The operations of the method 1200 may be implemented by a DMS or its components as described herein. For example, the operations of the method 1200 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1205, the method may include determining, by a DMS, to capture a first snapshot of a computing object within a computing system. The operations of 1205 may be performed in accordance with examples as disclosed herein. In some examples, aspects of the operations of 1205 may be performed by a backup component 725 as described with reference to FIG. 7.

At 1210, the method may include identifying, by the DMS, a set of multiple components corresponding to respective portions of the computing object. The operations of 1210 may be performed in accordance with examples as disclosed herein. In some examples, aspects of the operations of 1210 may be performed by an object identification component 730 as described with reference to FIG. 7.

At 1215, the method may include transmitting, from the DMS to the computing system, signaling that instructs the computing system to generate a set of snapshots including respective snapshots of the components. The operations of 1215 may be performed in accordance with examples as disclosed herein. In some examples, aspects of the operations of 1215 may be performed by an instruction component 735 as described with reference to FIG. 7.

At 1220, the method may include generating the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system. The operations of 1220 may be performed in accordance with examples as disclosed herein. In some examples, aspects of the operations of 1220 may be performed by a snapshot generation component 740 as described with reference to FIG. 7.

At 1225, the method may include determining to restore one or more portions of the computing object based on the set of snapshots. The operations of 1225 may be performed in accordance with examples as disclosed herein. In some examples, aspects of the operations of 1225 may be performed by a restore component 755 as described with reference to FIG. 7.

At 1230, the method may include determining one or more snapshots of the set of snapshots corresponding to the one or more portions of the computing object based on the first snapshot. The operations of 1230 may be performed in accordance with examples as disclosed herein. In some examples, aspects of the operations of 1230 may be performed by a snapshot component 745 as described with reference to FIG. 7.

At 1235, the method may include restoring the one or more portions of the computing object using the one or more snapshots. The operations of 1235 may be performed in accordance with examples as disclosed herein. In some examples, aspects of the operations of 1235 may be performed by a restore component 755 as described with reference to FIG. 7.

A method for data management is described. The method may include determining, by a DMS, to capture a first snapshot of a computing object within a computing system, identifying, by the DMS, a set of multiple components corresponding to respective portions of the computing object, transmitting, from the DMS to the computing system, signaling that instructs the computing system to generate a set of snapshots including respective snapshots of the components, and generating the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system.

An apparatus for data management is described. The apparatus may include at least one processor, memory coupled with the at least one processor, and instructions stored in the memory. The instructions may be executable by the at least one processor to cause the apparatus to determine, by a DMS, to capture a first snapshot of a computing object within a computing system, identify, by the DMS, a set of multiple components corresponding to respective portions of the computing object, transmit, from the DMS to the computing system, signaling that instructs the computing system to generate a set of snapshots including respective snapshots of the components, and generate the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system.

Another apparatus for data management is described. The apparatus may include means for determining, by a DMS, to capture a first snapshot of a computing object within a computing system, means for identifying, by the DMS, a set of multiple components corresponding to respective portions of the computing object, means for transmitting, from the DMS to the computing system, signaling that instructs the computing system to generate a set of snapshots including respective snapshots of the components, and means for generating the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system.

A non-transitory computer-readable medium storing code for data management is described. The code may include instructions executable by a processor to determine, by a DMS, to capture a first snapshot of a computing object within a computing system, identify, by the DMS, a set of multiple components corresponding to respective portions of the computing object, transmit, from the DMS to the computing system, signaling that instructs the computing system to generate a set of snapshots including respective snapshots of the components, and generate the first snapshot by the DMS, where the first snapshot generated by the DMS includes metadata for the set of snapshots generated by the computing system, the metadata including a first identifier for the first snapshot and a set of identifiers including respective identifiers for the respective snapshots included in the set of snapshots generated by the computing system.

In some examples of the method, apparatuses, and non-transitory computer-readable medium described herein, operations, features, means, or instructions for transmitting the signaling that instructs the computing system to generate the set of snapshots may include operations, features, means, or instructions for transmitting signaling to initiate a compute instance at the computing system, the compute instance for generating the set of snapshots.

In some examples of the method, apparatuses, and non-transitory computer-readable medium described herein, the signaling instructs the compute instance to initiate a set of RPCs, each RPC for generating a respective snapshot of the set of snapshots.

In some examples of the method, apparatuses, and non-transitory computer-readable medium described herein, the signaling initiates a set of compute instances at the computing system, the signaling instructing each compute instance of the set of compute instances to generate a respective snapshot of the set of snapshots.

Some examples of the method, apparatuses, and non-transitory computer-readable medium described herein may further include operations, features, means, or instructions for assigning, by the DMS, the set of identifiers to the set of snapshots in accordance with the identification of the set of multiple components, where the signaling includes the set of identifiers for inclusion in the metadata for the set of snapshots.

Some examples of the method, apparatuses, and non-transitory computer-readable medium described herein may further include operations, features, means, or instructions for transmitting, by the DMS, second signaling that instructs the computing system to generate or update a set of index files corresponding to the set of snapshots and associated with the first snapshot.

In some examples of the method, apparatuses, and non-transitory computer-readable medium described herein, a first index file of the set of index files corresponds to a first subset of snapshots of the set of snapshots, the first subset of snapshots including a set of multiple snapshots.

Some examples of the method, apparatuses, and non-transitory computer-readable medium described herein may further include operations, features, means, or instructions for determining, by the DMS, that a subset of snapshots of the set of snapshots failed to be generated and transmitting, by the DMS, second signaling that instructs the computing system to retry generation of the subset of snapshots.

In some examples of the method, apparatuses, and non-transitory computer-readable medium described herein, the second signaling may be specific to the subset of snapshots and excludes instructions associated with a second subset of snapshots of the set of snapshots for which generation was successful or may be ongoing.

Some examples of the method, apparatuses, and non-transitory computer-readable medium described herein may further include operations, features, means, or instructions for determining to restore one or more portions of the computing object based on the set of snapshots, determining one or more snapshots of the set of snapshots corresponding to the one or more portions of the computing object based on the first snapshot, and restoring the one or more portions of the computing object using the one or more snapshots.

In some examples of the method, apparatuses, and non-transitory computer-readable medium described herein, operations, features, means, or instructions for restoring the one or more portions of the computing object may include operations, features, means, or instructions for restoring a first portion of the computing object using a first snapshot of the one or more snapshots and concurrently restoring a second portion of the computing object using a second snapshot of the one or more snapshots.

In some examples of the method, apparatuses, and non-transitory computer-readable medium described herein, a respective portion of the computing object corresponds to a respective resource of the computing object that may be accessed via a respective API.

In some examples of the method, apparatuses, and non-transitory computer-readable medium described herein, a respective portion of the computing object corresponds to a document library, a web page, a public communication channel of a group-based communication platform, a set of files associated with the public communication channel, a private communication channel of the group-based communication platform, a set of files associated with the private communication channel, or metadata associated with one or more other portions of the computing object.

In some examples of the method, apparatuses, and non-transitory computer-readable medium described herein, the metadata associated with the one or more other portions of the computing object indicates a hierarchical relationship between the one or more other portions of the computing object.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
transmitting, from a data management system to a computing system, signaling that instructs the computing system to generate a set of respective snapshots at a first point in time of a plurality of components of a computing object within the computing system;
causing, by the data management system, storage of the set of respective snapshots in a first storage entity accessible to the data management system in association with a set of respective identifiers for the set of respective snapshots; and
causing, by the data management system, storage of a first snapshot corresponding to the first point in time for the computing object, wherein the first snapshot comprises metadata that associates the first snapshot to the set of respective identifiers for the set of respective snapshots stored in the first storage entity.

2. The method of claim 1, wherein the metadata comprises information that maps a first identifier of the first snapshot to the set of respective identifiers.

3. The method of claim 1, wherein the metadata comprises an indication of the first point in time.

4. The method of claim 1, further comprising:
causing, by the data management system, storage of respective metadata in association with the set of respective snapshots, the respective metadata indicative of the first point in time.

5. The method of claim 1, wherein transmitting the signaling that instructs the computing system to generate the set of respective snapshots comprises:
transmitting signaling to initiate a compute instance at the computing system, the compute instance for generating the set of respective snapshots.

6. The method of claim 5, wherein the signaling instructs the compute instance to initiate a set of remote procedure calls, each remote procedure call for generating a respective snapshot of the set of respective snapshots.

7. The method of claim 5, wherein the signaling initiates a set of compute instances at the computing system, the signaling instructing each compute instance of the set of compute instances to generate a respective snapshot of the set of respective snapshots.

8. The method of claim 1, further comprising:
assigning, by the data management system, the set of respective identifiers to the set of respective snapshots in accordance with an identification of the plurality of components, wherein the signaling comprises the set of respective identifiers for inclusion in the metadata.

9. The method of claim 1, further comprising:
transmitting, by the data management system, second signaling that instructs the computing system to generate or update a set of index files corresponding to the set of respective snapshots and associated with the first snapshot.

10. The method of claim 9, wherein a first index file of the set of index files corresponds to a first subset of snapshots of the set of respective snapshots, the first subset of snapshots comprising a plurality of snapshots.

11. The method of claim 1, further comprising:
determining, by the data management system, that a subset of snapshots of the set of respective snapshots failed to be generated; and
transmitting, by the data management system, second signaling that instructs the computing system to retry generation of the subset of snapshots.

12. The method of claim 11, wherein the second signaling is specific to the subset of snapshots and excludes instructions associated with a second subset of snapshots of the set of respective snapshots for which generation was successful or is ongoing.

13. The method of claim 1, further comprising:
determining to restore one or more portions of the computing object based at least in part on the set of respective snapshots;
determining one or more snapshots of the set of respective snapshots corresponding to the one or more portions of the computing object based at least in part on the first snapshot; and
restoring the one or more portions of the computing object using the one or more snapshots.

14. The method of claim 13, wherein restoring the one or more portions of the computing object comprises:
restoring a first portion of the computing object using a second snapshot of the one or more snapshots; and
concurrently restoring a second portion of the computing object using a third snapshot of the one or more snapshots.

15. The method of claim 1, wherein a respective portion of the computing object corresponds to a respective resource of the computing object that is accessed via a respective application programming interface.

16. The method of claim 1, wherein a respective portion of the computing object corresponds to a document library, a web page, a public communication channel of a group-based communication platform, a set of files associated with the public communication channel, a private communication channel of the group-based communication platform, a set of files associated with the private communication channel, or metadata associated with one or more other portions of the computing object.

17. The method of claim 16, wherein the metadata associated with the one or more other portions of the computing object indicates a hierarchical relationship between the one or more other portions of the computing object.

18. An apparatus, comprising:
at least one processor;

memory coupled with the at least one processor; and instructions stored in the memory and executable by the at least one processor to cause the apparatus to:

transmit, from a data management system to a computing system, signaling that instructs the computing system to generate a set of respective snapshots at a first point in time of a plurality of components of a computing object within the computing system;

cause, by the data management system, storage of the set of respective snapshots in a first storage entity accessible to the data management system in association with a set of respective identifiers for the set of respective snapshots; and cause, by the data management system, storage of a first snapshot corresponding to the first point in time for the computing object, wherein the first snapshot comprises metadata that associates the first snapshot to the set of respective identifiers for the set of respective snapshots stored in the first storage entity.

19. The apparatus of claim 18, wherein the metadata comprises information that maps a first identifier of the first snapshot to the set of respective identifiers.

20. A non-transitory computer-readable medium storing code, the code comprising instructions executable by at least one processor to:

transmit, from a data management system to a computing system, signaling that instructs the computing system to generate a set of respective snapshots at a first point in time of a plurality of components of a computing object within the computing system;

cause, by the data management system, storage of the set of respective snapshots in a first storage entity accessible to the data management system in association with a set of respective identifiers for the set of respective snapshots; and cause, by the data management system, storage of a first snapshot corresponding to the first point in time for the computing object, wherein the first snapshot comprises metadata that associates the first snapshot to the set of respective identifiers for the set of respective snapshots stored in the first storage entity.

* * * * *